US012564181B2

(12) United States Patent
Stokes et al.

(10) Patent No.: US 12,564,181 B2
(45) Date of Patent: Mar. 3, 2026

(54) CONTAINER FOR AQUATIC LIVE BAIT WITH DETACHABLE AIR PUMP UNIT

(71) Applicant: Flop Industries, LLC, Maryland Heights, MO (US)

(72) Inventors: Cody E. Stokes, St. Louis, MO (US); Thomas J. Dryer, Foley, MO (US)

(73) Assignee: Flop Industries, LLC, Maryland Heights, MO (US)

( * ) Notice: Subject to any disclaimer, the term of this patent is extended or adjusted under 35 U.S.C. 154(b) by 0 days.

(21) Appl. No.: 18/358,628

(22) Filed: Jul. 25, 2023

(65) Prior Publication Data

US 2024/0023532 A1 Jan. 25, 2024

Related U.S. Application Data

(60) Provisional application No. 63/369,300, filed on Jul. 25, 2022.

(51) Int. Cl.
A01K 97/05 (2006.01)
A01K 63/04 (2006.01)

(52) U.S. Cl.
CPC ............ A01K 97/05 (2013.01); A01K 63/042 (2013.01)

(58) Field of Classification Search
None
See application file for complete search history.

(56) References Cited

U.S. PATENT DOCUMENTS

| | | | |
|---|---|---|---|
| 299,765 | A | 6/1884 | Evans |
| 668,507 | A | 2/1901 | Fisk |
| 668,899 | A | 2/1901 | Ayers |
| 750,143 | A | 1/1904 | Wilson et al. |
| 1,435,457 | A | 11/1922 | Fearnow |
| 1,616,125 | A | 2/1927 | Holman |

(Continued)

FOREIGN PATENT DOCUMENTS

| | | |
|---|---|---|
| CA | 2414155 A1 | 6/2003 |
| CA | 3131180 A1 | 3/2022 |

(Continued)

OTHER PUBLICATIONS

Engel 13 Quart Live Bait Drybox/Cooler—Engel Coolers (https://engelcoolers.com), Internet accessed Jun. 6, 2023, 12 pages.

(Continued)

*Primary Examiner* — Jessica B Wong

(74) *Attorney, Agent, or Firm* — Stinson LLP

(57) ABSTRACT

A container for holding aquatic live bait. The container includes a base having an interior for holding water with the aquatic live bait contained therein. The interior has an opening to permit the aquatic live bait to be inserted into and removed from the interior. The base includes an air diffuser arranged to deliver air to the interior to aerate water in the interior and a first air connection fitting fluidly coupled to the air diffuser. A pump unit is removably connectable to the base. The pump unit includes an air pump for supplying air, a battery for powering the air pump, and a second air connection fitting fluidly coupled to the air pump. The second air connection fitting couples to the first air connection fitting when the pump unit is connected to the base to fluidly couple the air pump to the air diffuser.

53 Claims, 23 Drawing Sheets

(56) References Cited

U.S. PATENT DOCUMENTS

| | | | |
|---|---|---|---|
| 1,731,921 | A | 10/1929 | Coleman |
| 2,253,516 | A | 8/1941 | Bailey |
| 2,489,818 | A | 11/1949 | Roe |
| 2,507,444 | A | 5/1950 | Kar |
| 2,538,462 | A | 1/1951 | Klatt |
| 2,550,533 | A | 4/1951 | Reid |
| 2,636,308 | A | 4/1953 | Demmer, Sr. |
| 2,644,269 | A | 7/1953 | Ormesher |
| 2,663,115 | A | 12/1953 | McKissack |
| 2,767,509 | A | 10/1956 | Breithaupt |
| 2,767,510 | A | 10/1956 | Hopkins |
| 2,773,867 | A | 12/1956 | Cleckner |
| 2,863,255 | A | 12/1958 | Slipka |
| 2,883,789 | A | 4/1959 | Schwartz |
| 2,885,819 | A | 5/1959 | Newell |
| 2,899,103 | A | 8/1959 | Ebert |
| 3,191,336 | A | 6/1965 | Fant |
| 3,191,337 | A | 6/1965 | Fant |
| 3,201,017 | A | 8/1965 | Ernest |
| 3,216,650 | A | 11/1965 | Thyreen |
| 3,217,444 | A | 11/1965 | Deane |
| 3,348,330 | A | 10/1967 | Gilliam |
| 3,449,855 | A | 6/1969 | Hassell |
| 3,553,880 | A | 1/1971 | Splickan et al. |
| 3,831,310 | A | 8/1974 | Frangullie |
| 3,967,869 | A | 7/1976 | Jackson |
| 4,040,200 | A | 8/1977 | Tomita |
| 4,208,827 | A | 6/1980 | Lindaman |
| 4,462,180 | A | 7/1984 | Scott |
| 4,615,137 | A | 10/1986 | Radmanovich |
| 4,697,380 | A | 10/1987 | Fenske |
| 4,712,327 | A | 12/1987 | Ross, Sr. et al. |
| 4,757,636 | A | 7/1988 | Lambourn |
| 5,172,511 | A | 12/1992 | Smith |
| 5,193,301 | A * | 3/1993 | Figgins ................ A01K 63/042 43/57 |
| 5,231,789 | A | 8/1993 | Radmanovich |
| 5,267,410 | A * | 12/1993 | Peyatt .................... A01K 97/05 43/57 |
| 5,305,542 | A * | 4/1994 | Phelps ................... A01K 97/05 43/57 |
| 5,305,544 | A | 4/1994 | Testa |
| 5,471,779 | A | 12/1995 | Downey |
| 5,480,590 | A | 1/1996 | Neshat |
| 5,634,291 | A | 6/1997 | Pham |
| 5,799,435 | A | 9/1998 | Stafford |
| 5,802,760 | A | 9/1998 | Campbell |
| 5,921,017 | A | 7/1999 | Clark |
| 5,992,086 | A * | 11/1999 | Cheng .................... A01K 97/06 43/57 |
| 6,363,658 | B1 | 4/2002 | Lai |
| 6,367,403 | B1 | 4/2002 | Carter |
| 6,729,066 | B1 | 5/2004 | Howley |
| 6,755,428 | B2 | 6/2004 | Butler |
| 6,836,998 | B1 * | 1/2005 | Rucker .................. A01K 97/05 43/57 |
| 6,996,291 | B2 | 2/2006 | Nahum |
| 7,140,600 | B1 | 11/2006 | Wrey |
| 7,389,608 | B1 | 6/2008 | MacKay |
| 7,958,667 | B1 | 6/2011 | Pallack |
| 8,387,940 | B2 | 3/2013 | Gros |
| 8,572,889 | B1 * | 11/2013 | Hughes ................ A01K 63/065 43/56 |
| 8,615,921 | B1 | 12/2013 | Weems |
| 8,806,803 | B1 | 8/2014 | Mitchell |
| 8,875,934 | B2 | 11/2014 | Deka |
| 9,220,250 | B1 | 12/2015 | Davis, Sr. |
| 11,382,321 | B1 | 7/2022 | Vann, III |
| 11,684,056 | B1 | 6/2023 | Bailey |
| 12,089,570 | B2 | 9/2024 | Xie |
| 2004/0262319 | A1 | 12/2004 | Fisher |
| 2006/0261111 | A1 | 11/2006 | McCoy et al. |
| 2007/0186836 | A1 | 8/2007 | Tipton |

| | | | |
|---|---|---|---|
| 2008/0028667 | A1 * | 2/2008 | Grzybowski ........ A01K 63/042 43/57 |
| 2009/0064565 | A1 | 3/2009 | Sloop |
| 2012/0085019 | A1 | 4/2012 | Link |
| 2014/0014669 | A1 | 1/2014 | Smith |
| 2015/0000607 | A1 | 1/2015 | Reid |
| 2015/0377549 | A1 | 12/2015 | Cai et al. |
| 2017/0223941 | A1 | 8/2017 | Cornwell |
| 2019/0183099 | A1 | 6/2019 | Lin |
| 2020/0269894 | A1 | 8/2020 | Cohen |
| 2020/0345132 | A1 | 11/2020 | White |
| 2021/0268452 | A1 | 9/2021 | Lee |
| 2021/0345588 | A1 * | 11/2021 | Leach .................... A01K 97/20 |
| 2022/0386579 | A1 | 12/2022 | Stokes et al. |
| 2023/0110277 | A1 | 4/2023 | Caron |
| 2023/0112280 | A1 | 4/2023 | Banal |
| 2023/0213264 | A1 | 7/2023 | Jacob |
| 2023/0292717 | A1 | 9/2023 | Himes |
| 2023/0329199 | A1 | 10/2023 | Hegg |
| 2024/0223532 | A1 | 7/2024 | Zhang et al. |

FOREIGN PATENT DOCUMENTS

| | | | |
|---|---|---|---|
| CN | 204540467 | U | 8/2015 |
| CN | 105230586 | A | 1/2016 |
| CN | 205320973 | U | 6/2016 |
| CN | 205756686 | U | 12/2016 |
| CN | 205830855 | U | 12/2016 |
| CN | 205946962 | U | 2/2017 |
| CN | 207505770 | U | 6/2018 |
| CN | 209449510 | U | 10/2019 |
| CN | 215270165 | U | 3/2022 |
| GB | 2450120 | A | 12/2008 |
| JP | H04320635 | A | 11/1992 |
| JP | H0742920 | U | 8/1995 |
| JP | 2004344119 | A | 12/2004 |
| JP | 2007097504 | A | 4/2007 |
| JP | 2007097505 | A | 4/2007 |
| JP | 4553145 | B2 | 9/2010 |
| JP | 2011027381 | A | 2/2011 |
| JP | 3210864 | U | 6/2016 |
| JP | 3297030 | B2 | 7/2022 |
| KR | 940005187 | Y1 | 8/1994 |
| KR | 20000017198 | U | 9/2000 |
| KR | 200401528 | Y1 | 11/2005 |
| KR | 200420103 | Y1 | 6/2006 |
| KR | 101485574 | B1 | 1/2015 |
| KR | 101495268 | B1 | 2/2015 |
| KR | 20200064768 | A | 6/2020 |
| WO | 2013027933 | A2 | 2/2013 |
| WO | 2013027933 | A3 | 4/2013 |

OTHER PUBLICATIONS

Bait Station Bucket—Frabill (2023), 4 pages.
Bait Shack (https://whiskerseeker.com/solar-powered-bait-shack/) (Internet accessed 2023), 8 pages.
Bait Box with Aerator—Frabill (Internet accessed 2023), 4 pages.
Amazon.com—Frabill Bait Station Bucket—Large Aerated Live Bait 6-Gallon Storage (Internet accessed 2023), 13 pages.
Amazon.com—Frabill Bait Box with Aerator—Live Bait Storage Cooler with Portable Aerator—8-Quart Capacity (Internet accessed 2023), 9 pages.
Amazon.com—Engel 13qt Live Bait Cooler Box with 2nd Gen 2-Speed Portable Aerator Pump. Fishing Bait Station and Minnow Bucket for Shrimp, Minnows, and Other Live Bait—ENGLBC13-N (Internet accessed 2023), 10 pages.
Engel Extra Large Lithium-ion Rechargeable Live Bait Aerator Pump—Engel Coolers (https://engelcoolers.com), Internet accessed Jul. 19, 2023, 11 pages.
Frabill Magnum Bait Station, YouTube.com, Jun. 18, 2019, 4 pages.
Frabill Magnum Bait Station 13 Quart Live Bait Well, Amazon. com, Nov. 20, 2023, 9 pages.

* cited by examiner

CONTAINER FOR AQUATIC LIVE BAIT WITH DETACHABLE AIR PUMP UNIT

CROSS-REFERENCE TO RELATED APPLICATION

The present application claims priority to U.S. Provisional Application No. 63/369,300, filed on Jul. 25, 2022, the entirety of which is incorporated by reference.

FIELD

The present disclosure generally relates to containers for aquatic live bait and more particularly to aerated containers for aquatic live bait.

BACKGROUND

Fishermen go to great expense to obtain live aquatic bait such as minnows, shiners, shrimp and the like but the bait will die if the water in which they are kept gets too warm and/or if the oxygen level in the water drops too low. To be effective bait for fish, the bait must be kept alive. This is not easy if the bait must be obtained a long time prior to when it is used and the weather is warm.

SUMMARY

In one aspect, a container for aquatic live bait comprises a base having an interior sized and shaped to hold water with aquatic live bait. The interior has an opening sized and shaped to permit aquatic live bait to be inserted into and removed from the interior. The base includes an air diffuser arranged to deliver air to the interior to aerate water in the interior and a first air connection fitting fluidly coupled to the air diffuser. A pump unit is removably connectable to the base. The pump unit includes an air pump configured to supply air, a power source configured to power the air pump, and a second air connection fitting fluidly coupled to the air pump. The second air connection fitting is configured to couple to the first air connection fitting to fluidly couple the air pump to the air diffuser to supply air for the air diffuser. A lid may be provided to close the opening of the interior.

In another aspect, a container comprises a base having an interior with an opening sized and shaped to permit access to the interior. A lid is supported by the base and is pivotable relative to the base between a closed position where the lid is arranged to close the opening of the interior and an open position where the lid is arranged to permit access to the interior via the opening. The lid includes a lid body and a brace. The brace extends along a length of the lid and engages the lid body at multiple structural support locations. A latch is coupled to the lid and is configured to secure the lid in the closed position by applying a closing force to the lid that presses the lid against the base. The brace is arranged to distribute the closing force from the latch over the multiple structural support locations.

In another aspect, a container comprises a base having an interior with a top opening sized and shaped to permit access to the interior. A lid is supported by the base and is pivotable relative to the base between a closed position where the lid is arranged to close the top opening of the interior and an open position where the lid is arranged to permit access to the interior via the top opening. A latch assembly is configured to secure the lid in the closed position. The latch assembly includes a first latch, a second latch, and a handle. The first and second latches are configured to secure the lid in the closed position. The handle is operatively connected to the first and second latches for releasing the first and second latches to permit the lid to move from the closed position toward the open position.

In another aspect, a container assembly comprises a container having opposite first and second sidewalls. The first sidewall includes a first connection recess adjacent a lower end of the first sidewall and the second sidewall includes a second connection recess adjacent a lower end of the second sidewall. A container mount includes a base configured to be attached to a mounting surface. A first retainer is supported by the base and is arranged to be received by the first connection recess. A second retainer is supported by the base and is arranged to be received by the second connection recess. The first and second retainers are configured to couple the container to the container mount when the first and second retainers are received by the respective first and second connection recesses. A foot pedal is operatively connected to the first retainer such that actuation of the food pedal moves the first retainer relative to the base.

In another aspect, an aeration assembly for a container comprises a pump unit mount including an air outlet port and a first air connection fitting fluidly coupled to the air outlet port. A pump unit is removably connectable to the pump unit mount. The pump unit includes an air pump configured to supply air, a battery configured to power the air pump, and a second air connection fitting fluidly coupled to the air pump. The second air connection fitting is configured to couple to the first air connection fitting when the pump unit is connected to the pump unit mount to fluidly couple the air pump to the air outlet to supply air for the air outlet.

Other objects and features will be in part apparent and in part pointed out hereinafter.

3

Figure 20:
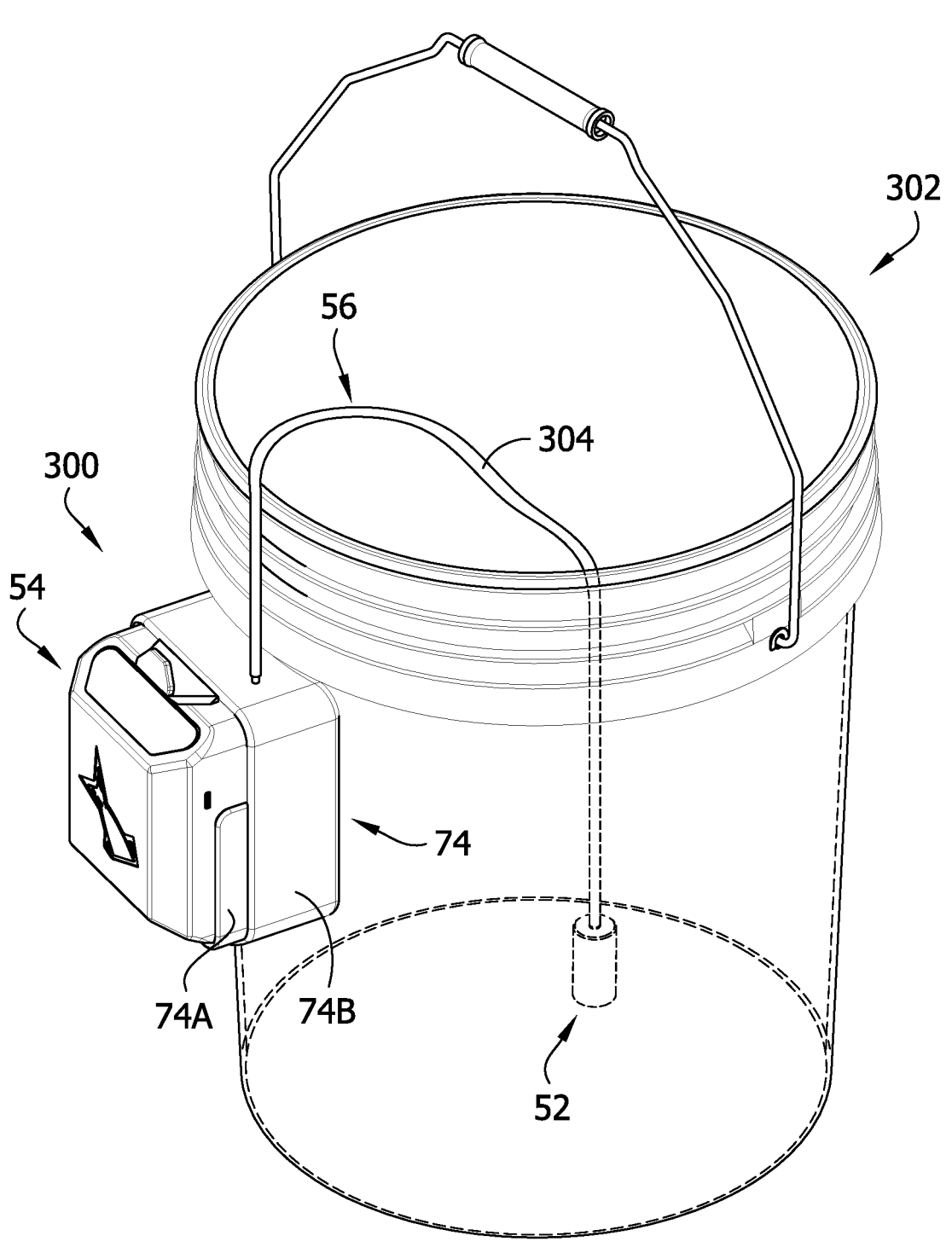
Figure 21:
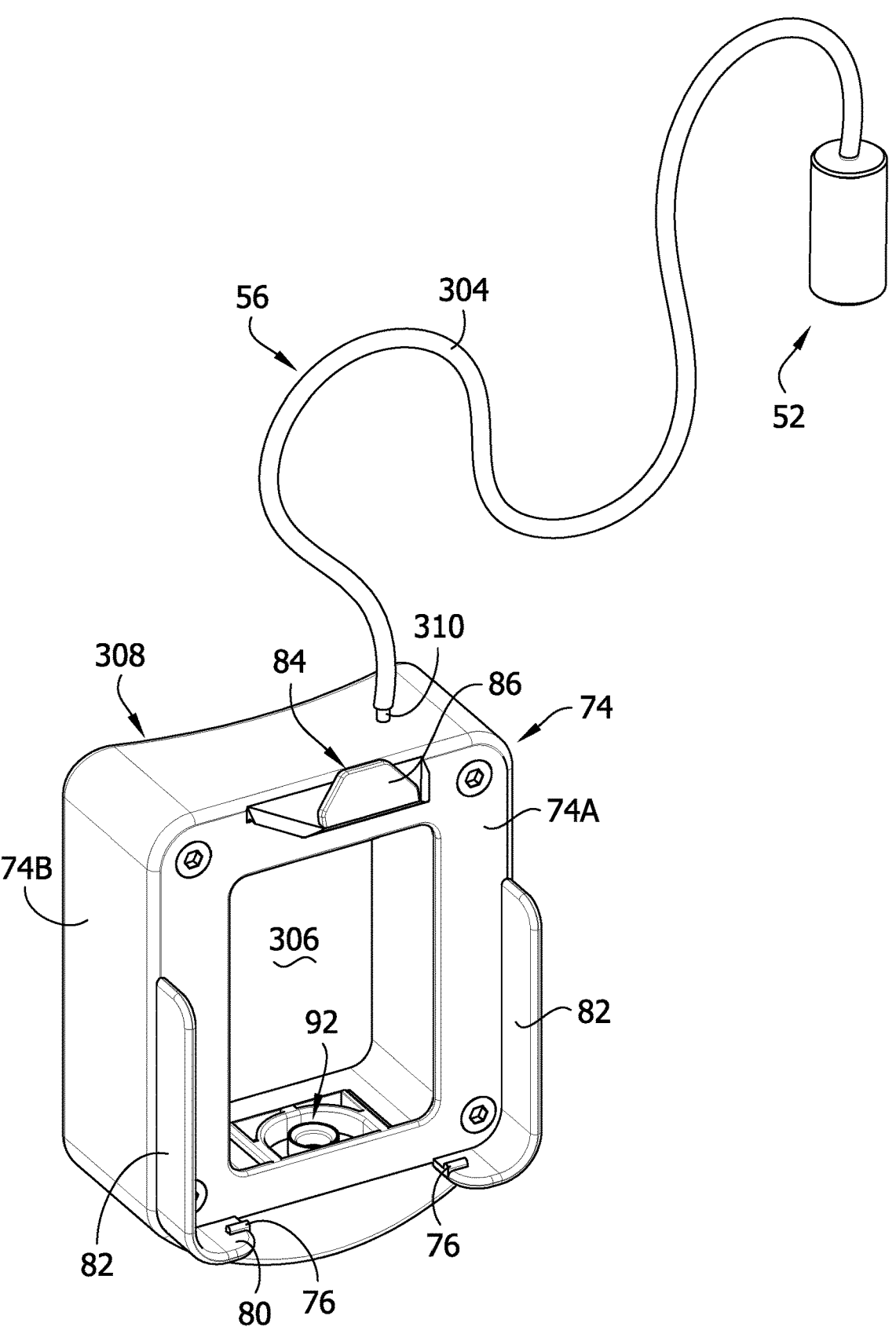
Figure 22:
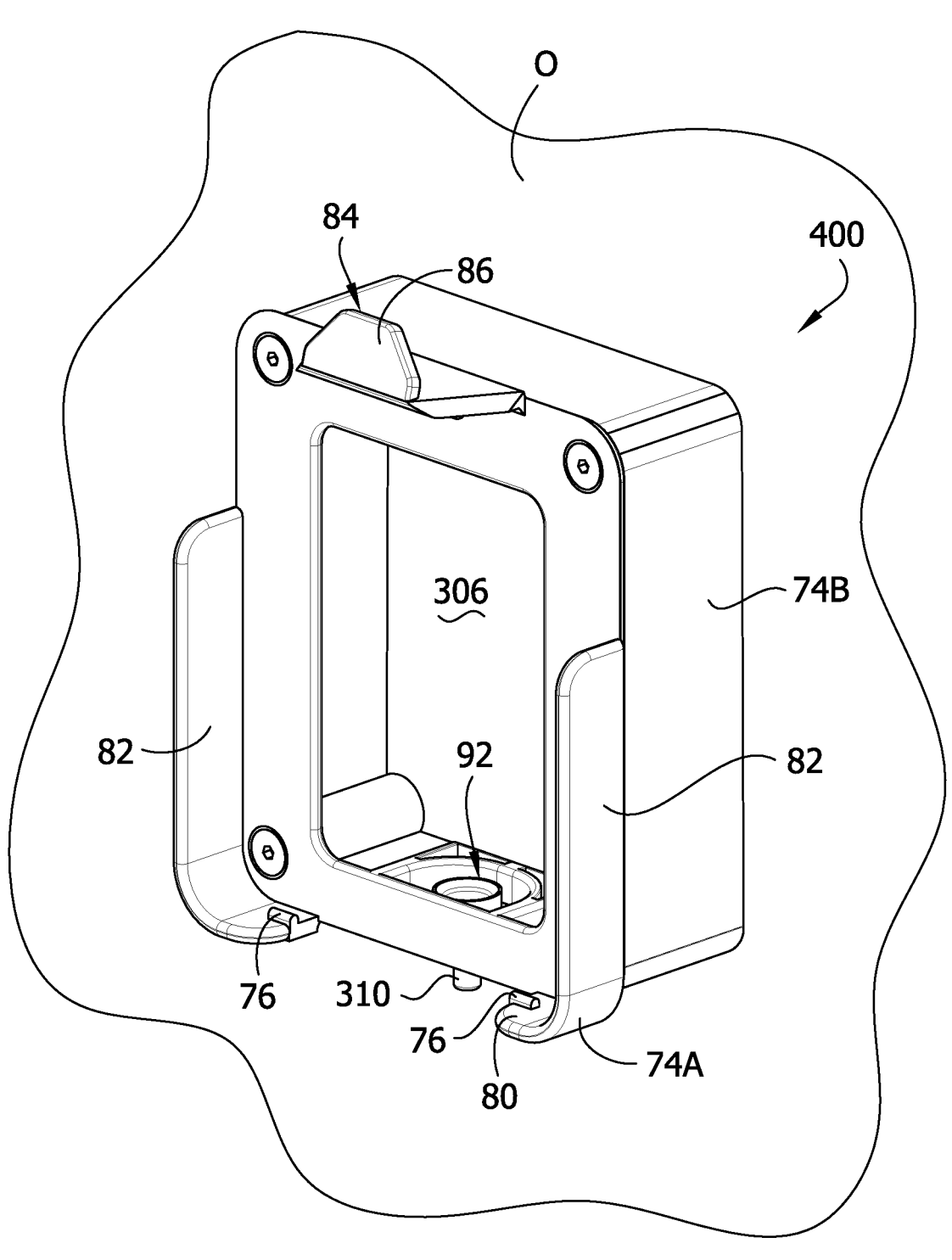
Figure 23:
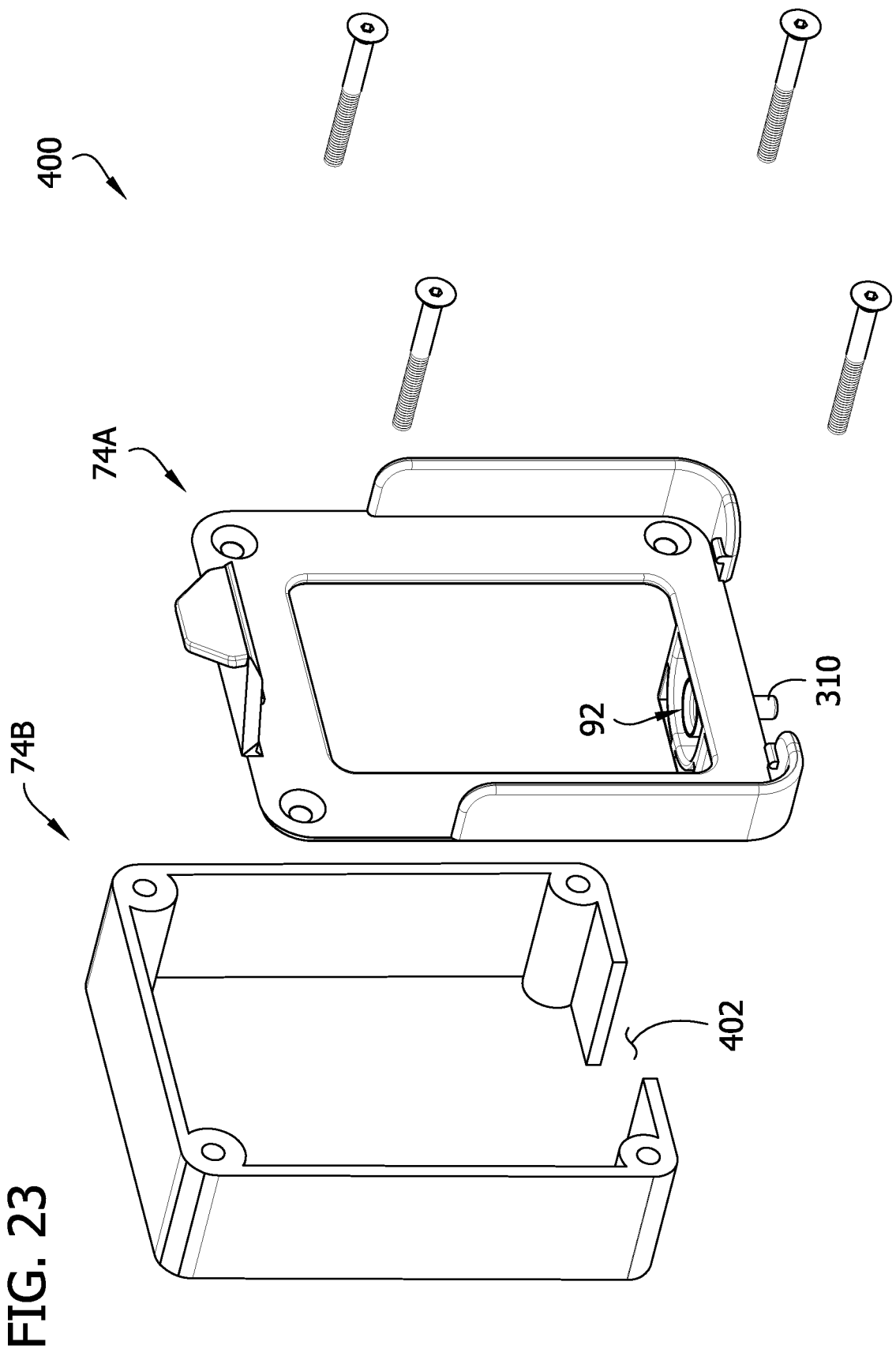

FIG. 20 is a perspective of an aeration assembly according to one embodiment of the present disclosure mounted to a container;

FIG. 21 is a perspective of a mount for a pump unit of the aeration assembly;

FIG. 22 is a perspective of a pump unit mount according to one embodiment of the present disclosure; and FIG. 23 is an exploded view of the pump unit mount of FIG. 22.

Corresponding reference characters indicate corresponding parts throughout the drawings.

DETAILED DESCRIPTION

Figure 1:
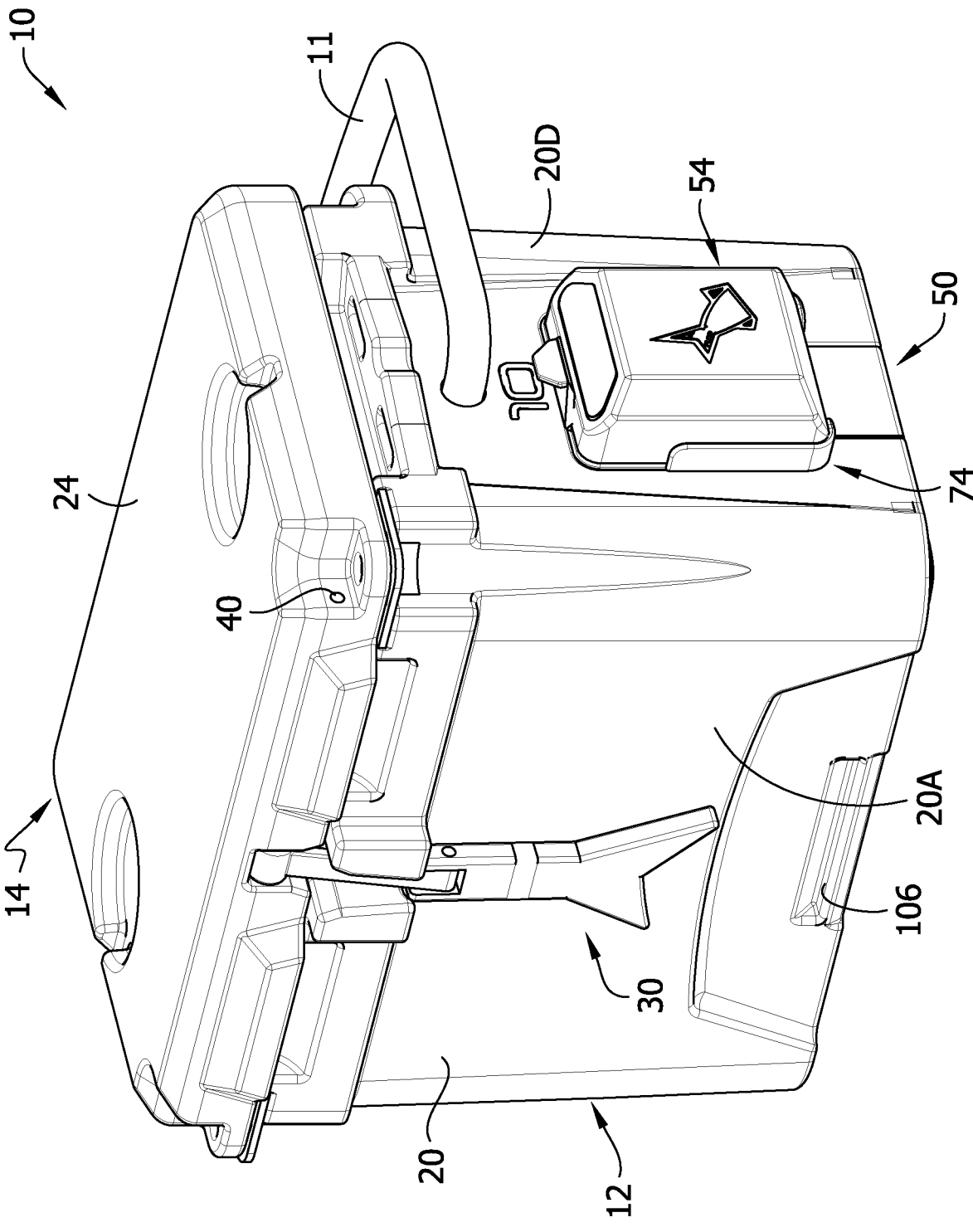
FIG. 1 is a perspective of container according to one embodiment of the present disclosure.
Figure 2:
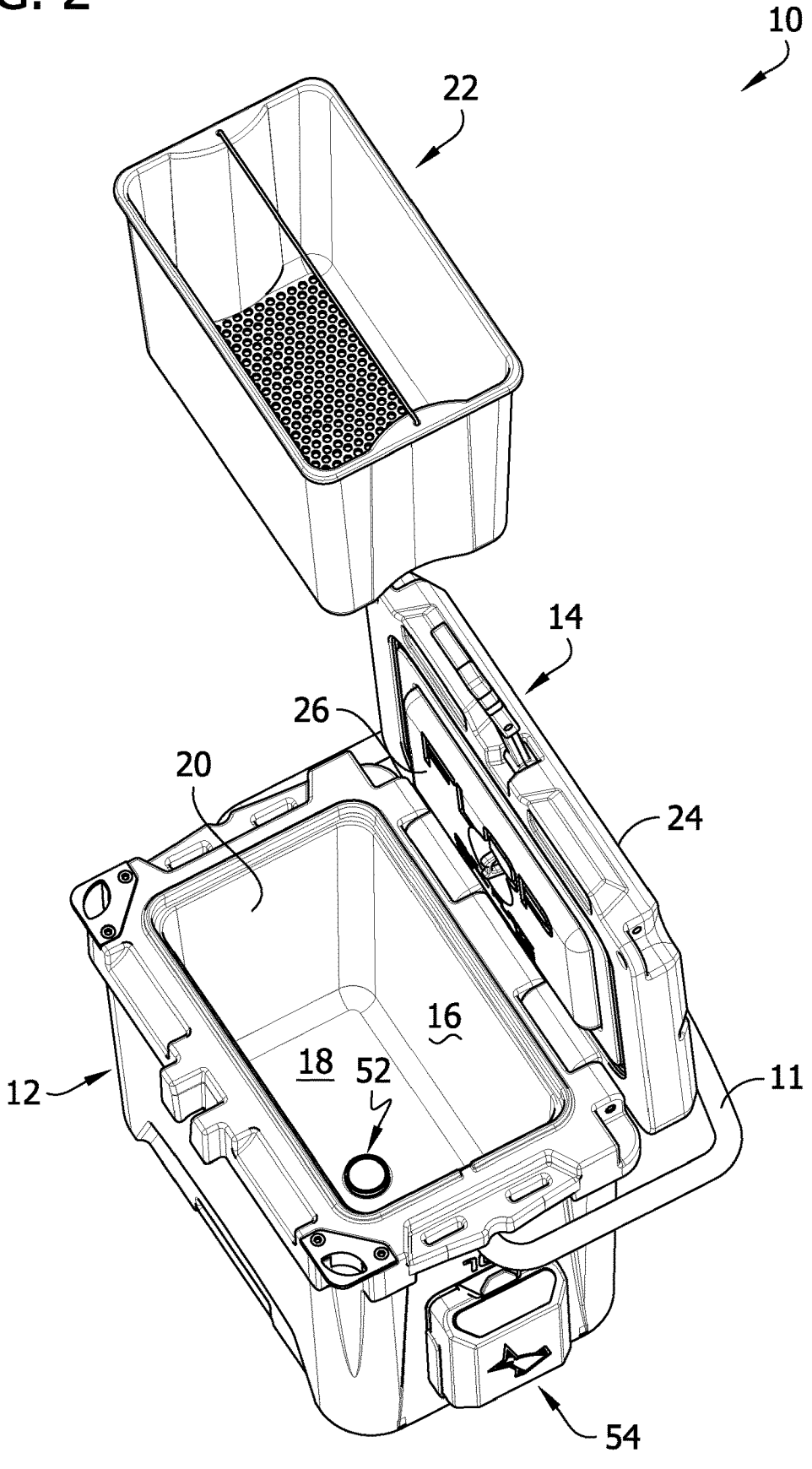
FIG. 2 is a perspective of the container, showing a lid of the container in an open position and a basket removed.

Referring to FIGS. 1 and 2, a container (e.g., a bait container) for aquatic live bait (broadly, contents) according to one embodiment of the present disclosure is generally indicated by reference numeral 10. The container 10 may be used to hold water containing aquatic live bait (not shown). It is understood that the container 10 is not limited to holding aquatic live bait and that the container can hold (e.g., contain, carry) other items without departing from the scope of the present disclosure.

The container 10 includes base 12 and a lid 14. The base 12 defines or includes an interior 16. The interior 16 is sized and shaped to hold water with aquatic live bait therein. The interior 16 has a top opening (at the upper end of the base 12) sized and shaped to permit access to the interior, e.g., to permit aquatic live bait to be inserted into and removed from the interior. The base 12 includes a bottom wall 18 and a sidewall 20. In the illustrated embodiment, the base 12 has a generally hexahedron shape with the sidewall 20 having opposite front and rear (e.g., first and second) sidewalls 20A, 20B and opposite left and right (e.g., third and fourth) sidewalls 20C, 20D. Other shapes can be used without departing from the scope of the present disclosure. The bottom wall 18 and sidewall 20 bound the interior 16. The container may include a bait basket 22 (e.g., strainer basket). The bait basket 22 may be mesh or otherwise perforated. The bait basket 22 is sized and shaped to fit in the interior 16, in close conformance with the sidewall 20, and allows a user to easily withdraw aquatic live bait from the interior. Desirably, the base 12 (e.g., bottom wall 18 and sidewall 20) is insulated, such as with polyurethane foam or the like. The container 10 may include a handle 11 attached to the base 12. The handle 11 may pivot or rotate relative to the base 12.

Referring to FIGS. 1-6, the lid 14 is supported by the base 12 and is arranged to open and close the top opening of the interior 16. The lid 14 is pivotable relative to the base 12 between a closed position (FIG. 1) and an open position (FIG. 2). In the closed position, the lid 14 is arranged to close the top opening of the interior 16. In the open position, the lid 14 is arranged to permit access to the interior 16 via the top opening (e.g., the lid does not block or cover the top opening). In the illustrated embodiment, one or more hinges connect the lid 14 to the rear sidewall 20B. The lid 14 includes a lid body 24. Desirably, the lid body 24 is insulated, such as with polyurethane foam or the like. The lid 14 may include an ice pack 26 removably attached (such as with a fastener) to the underside of the lid body 24 for keeping the interior 16 cool. One or both of the base 12 and lid 14 may include a gasket 28 arranged to be compressed between the sidewall 20 and the lid body 24. The gasket 28 generally extends around the top opening of the interior 16 (when the lid 14 is in the closed position). The gasket 28, the sidewall 20 and/or the lid 14 may include one or more cut-outs or recesses (not shown) which prevent the gasket from forming a complete seal between the base 12 and the lid 14. These recesses form one or more air vents that permit air to escape the interior 16. Air vents of other configurations are within the scope of the present disclosure.

Figure 3:
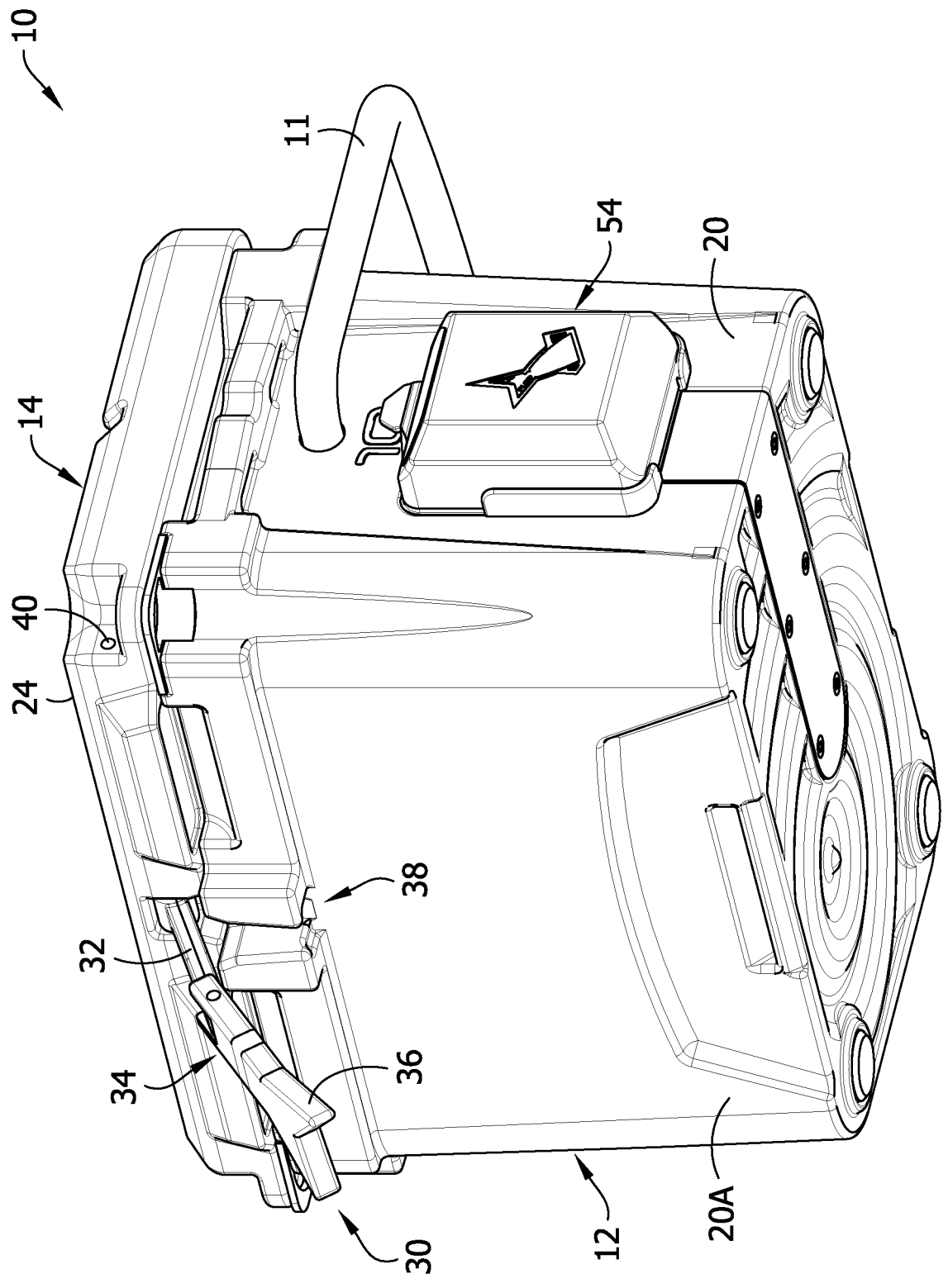
FIG. 3 is an enlarged perspective of a latch of the container in a release configuration.
Figure 4:
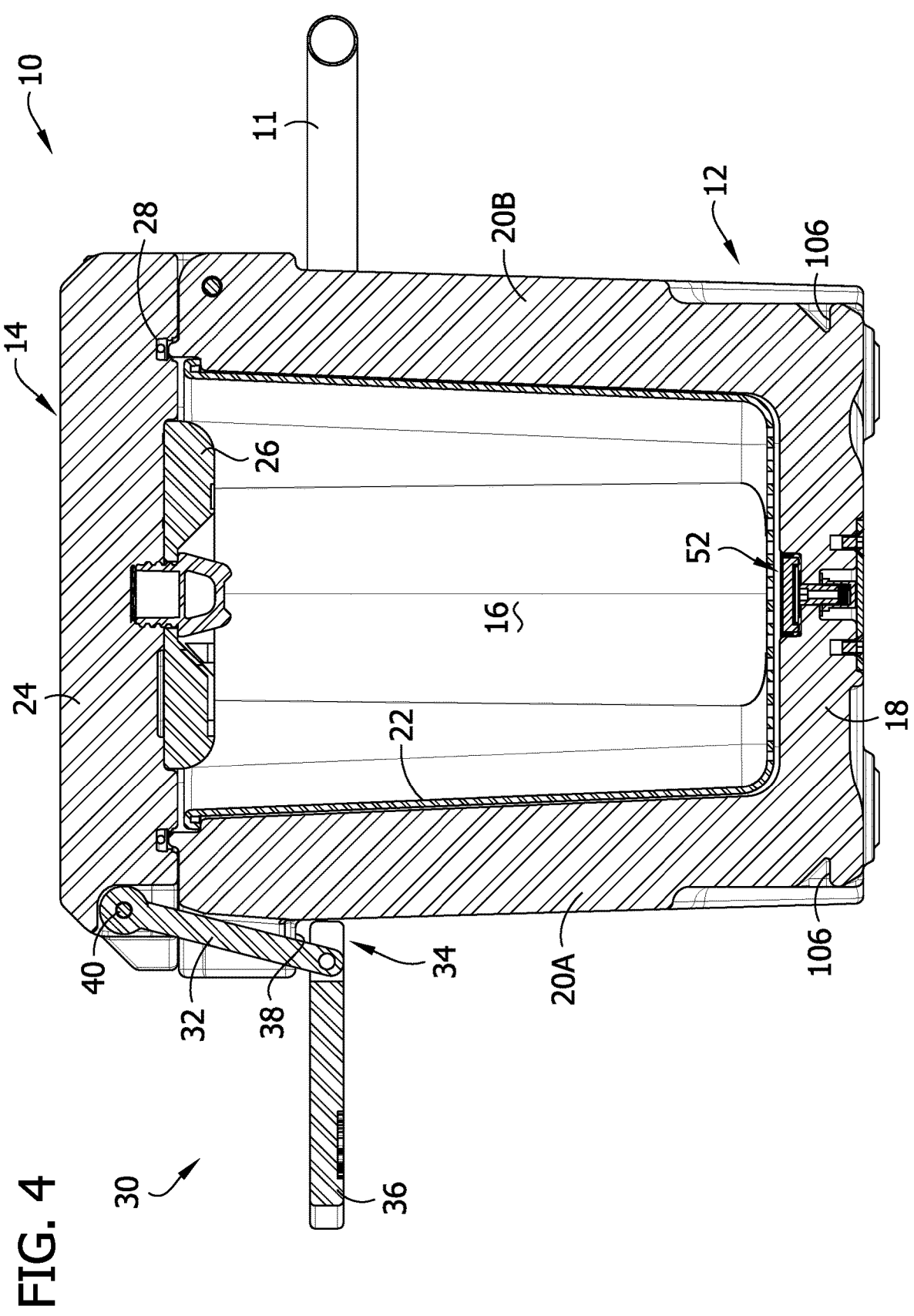
FIG. 4 is a cross section of the container with the latch in position to be moved to a securing configuration.
Figure 5:
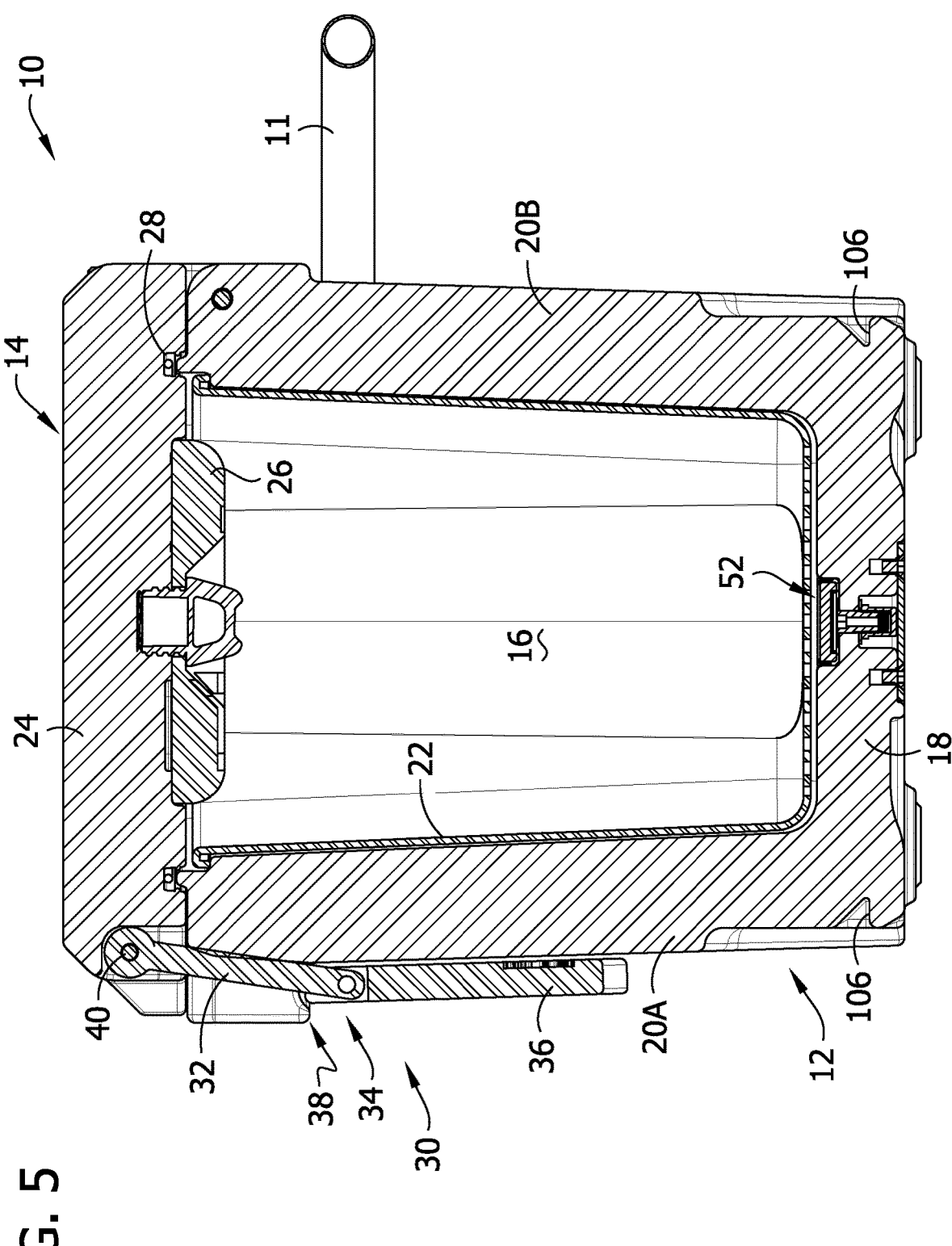
FIG. 5 is a cross section of the container with the latch in the securing configuration.
Figure 6:
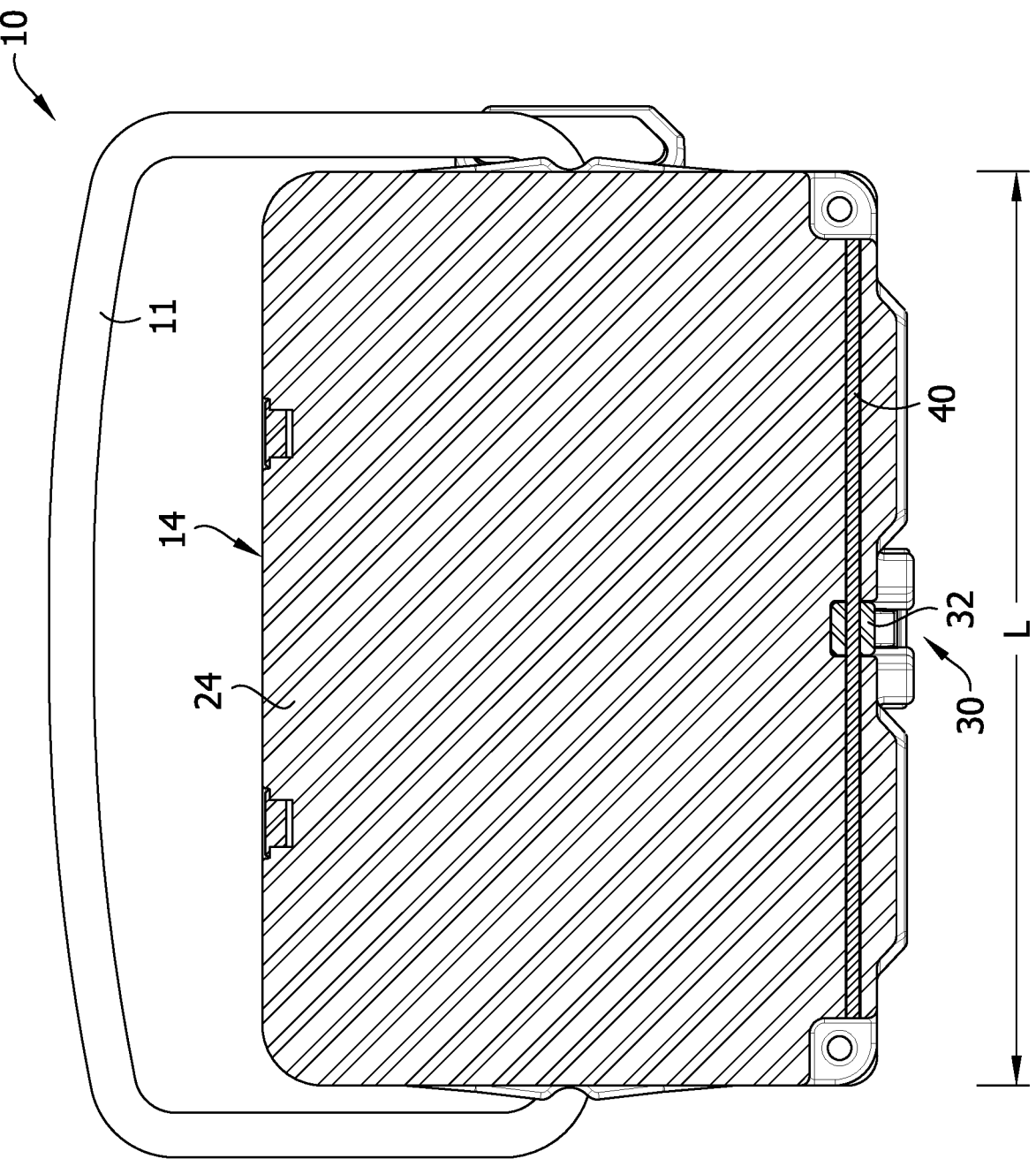
FIG. 6 is a cross section through the lid of the container.

The container 10 includes a closure for securing the lid 14 in the closed position. In the embodiment illustrated in FIGS. 1-6, the closure includes a latch 30 coupled to the lid 14. The latch 30 is configured to secure the lid 14 in the closed position. Desirably, the lid 14 secures the lid 14 in the closed position by applying a closing force to the lid that presses the lid against the base 12 (e.g., upper end of the sidewall 20), thereby compressing the gasket 28. The closing force generally extends downward, toward the bottom wall 18 of the base 12. In the illustrated embodiment, the latch 30 comprises a cam (e.g. cam-over) latch, although other types of latches are within the scope of the present disclosure. The latch 30 includes a link 32 pivotable or rotatable relative to the lid body 24, a cam 34 pivotably or rotatably connected to the link 32, and a handle 36 connected to the cam. The cam 34 has a cam face that meets or engages a keeper 38 of the base 12 (e.g., the front sidewall 20A). The keeper 38 defines a recess that receives the cam 34. The handle 36 is used to move the latch 30 between a securing configuration (FIGS. 1 and 5) and a release configuration (FIGS. 3 and 4). In the securing configuration, the latch 30 is arranged to secure the lid 14 in the closed position. The cam face of the cam 34 engages the keeper 38. In the release configuration, the latch 30 is arranged to permit the lid 14 to move from the closed position toward the open position. The cam face of the cam 34 is not engaged with the keeper 38. To secure the lid 14 in the closed position (e.g., move the latch 30 from the release configuration to the securing configuration), the cam face of the cam 34 is positioned below the keeper 38 (see FIG. 4) and then the handle 36 is rotated toward the base 12 of the container 10. This rotation engages the cam face with the keeper 38, thereby pulling the link 32 downward to create tension, thereby pulling the lid 14 downward. This tension also keeps the latch 30 in the securing configuration, due to the cam-over (e.g., the cam 34 was rotated over-center by the handle 36 when moved to the securing configuration). To release the latch 30, the user rotates the handle 36 away from the base 12 to disengage the cam 34 from the keeper 38. The handle 36 is sized and shaped to be engaged by a single hand of the user. In this way, the user has a free hand, such as to steady the container 10 when rotating the handle 36 and/or to grab bait out of the interior 16.

Desirably, the latch assembly is the one and only latch assembly (e.g., single handle) configured to secure the lid 14 in the closed position. The single latch assembly makes opening and closing the lid 14 easier and faster compared to other containers having multiple independent latches, which each need to be individually actuated by the user by use of multiple handles. To make sure the lid 14 has sufficient rigidity and strength so that it can be used with a single latch 30, the lid includes a brace 40 (FIG. 6) (e.g., a high strength brace). The brace 40 is arranged to distribute the closing force from the latch 30 across a length L of the lid 14 (e.g. lid body 24). It has been found that a single latch can cause a lid (especially a plastic lid) to warp over time (e.g., the lid bowing to have higher ends than the location of the latch), preventing the lid from fully closing the interior. Having the brace 40 sufficiently strengthens and rigidifies the lid body 24, thereby preventing the lid body from warping over time. The brace 40 extends along the length L of the lid 14 (e.g., lid body 24). Desirably, the brace 40 extends over a majority of the length L of the lid 14, or more desirably over at least 75% of the length of the lid, or even more desirably over at least 90% of the length L of the lid, or even more desirably over the entirety of the length of the lid. In one embodiment, the brace 40 extends past the opposite left and right sides of the interior 16. In other words, a length of the brace 40 is greater than (broadly, greater than or equal to) a length of the interior 16 and the brace is arranged on the lid body 24 such that its opposite left and right ends are each at or outboard of the left and right sides of the interior. The brace 40 engages the lid body 24 at a plurality of structural support locations, generally spaced apart along the length L. The brace 40 distributes the closing force from the latch 30 over the plurality of structural support locations. Desirably, the brace 40 engages the lid body 24 generally continuously along the length L of the lid body 24 to distribute the closing force. The brace 40 is made of a stronger material than the lid body 24. For example, the lid body 24 may comprise plastic and the brace 40 may comprise metal (e.g., steel). In one embodiment, brace 40 is in the shape of a bar or rod (e.g., metal rod), although other configurations are within the scope of the present disclosure. In the illustrated embodiment, the brace 40 is embedded in the lid body 24. In one method of construction, a hole is drilled through the lid body 24 and then the brace 40 is inserted (e.g., pressed) therein. The brace 40 may include one or more barbs (not shown) that dig into the lid body 24 to inhibit the brace from moving relative to the lid body once installed. One or both ends of the brace 40 may also include a head arranged to engage an exterior surface of the lid body 24 to prevent the brace from moving through (e.g., being pushed through) the lid body. The brace 40 extends along a front edge margin of the lid body 24. Desirably, the latch 30 is directly attached to the brace 40, as illustrated, to directly transfer the closing force to the brace. In the illustrated embodiment, the brace 40 extends through the link 32 and the link pivots about the brace.

The single center cam latch 30 of the container 10 can be operated with one hand so that the other hand is free to collect bait from the box. The brace 40 prevents the closing force from the single center latch 30 from warping the lid body 24 (e.g., left/right sides of lid body warping upward and not forming desired seal). The brace 40 and structurally integrated support locations are employed to evenly distribute the force from the center latch 30 across the lid body 24. Desirably, the brace 40 passes through the entirety of the lid body 24 (extends from side to side). This reinforces and strengths the lid 14. Multiple integrated structural support locations (e.g., engagements of lid body 24 with the brace 40) to evenly distribute pressure from the latch 30 allowing a complete seal and preventing lid warpage.

It will be appreciated that although a single latch is provided, other numbers of latches can be used, independently or in a single latch assembly, without departing from the scope of the present disclosure.

Figure 7:
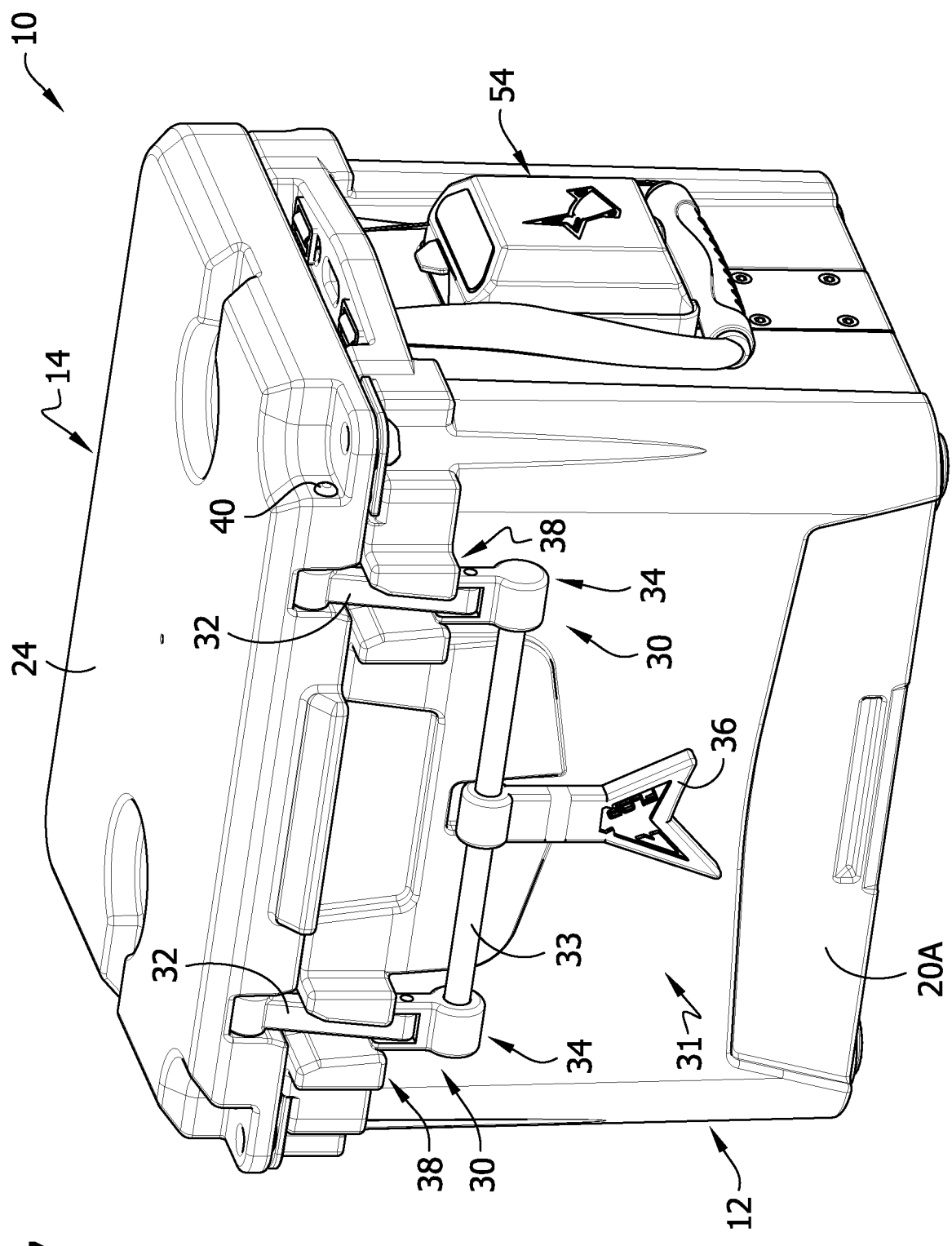
FIG. 7 is a perspective of a container according to another embodiment of the present disclosure.
Figure 8:
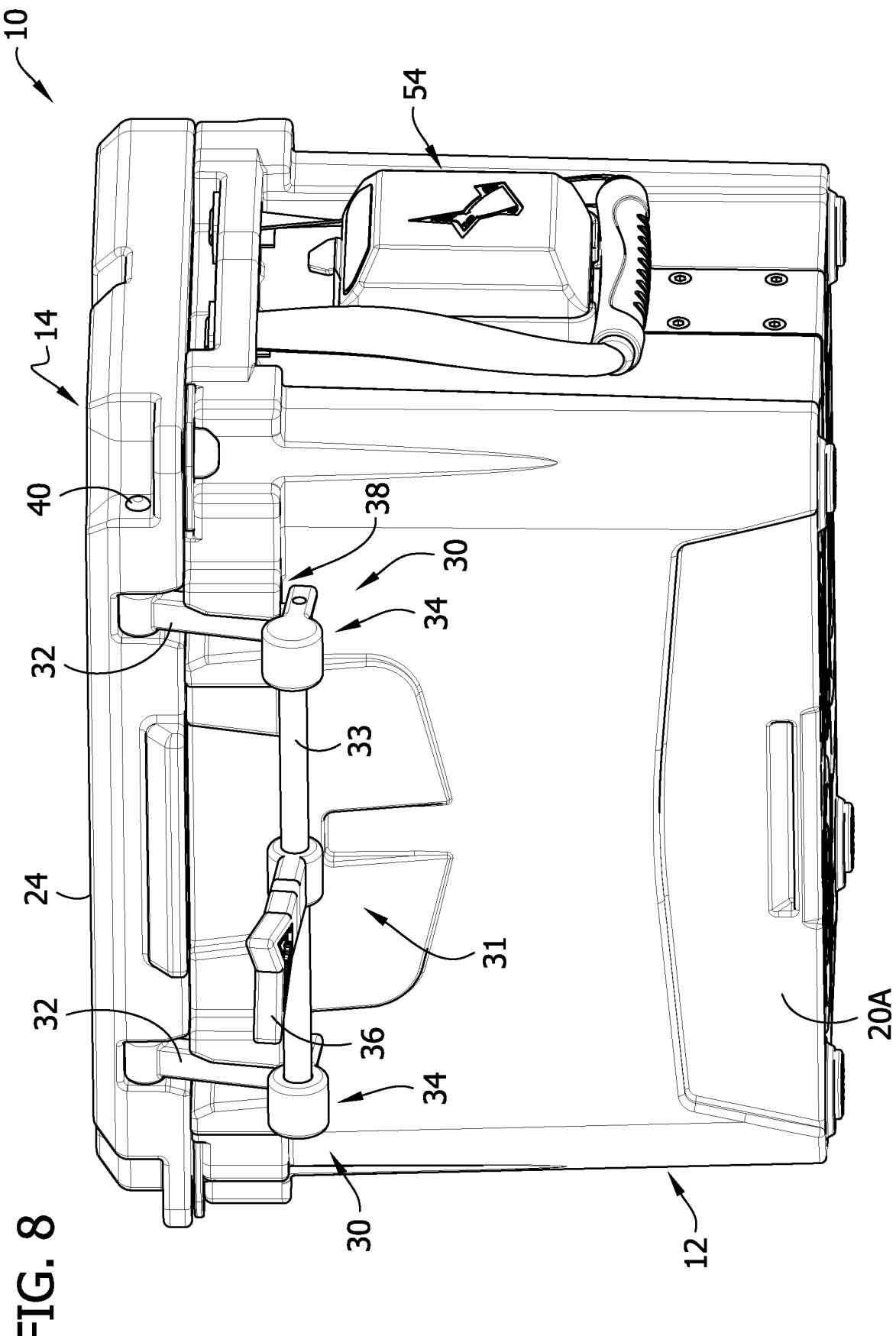
FIG. 8 is an enlarged perspective of a latch assembly of the container of FIG. 7.
Figure 9:
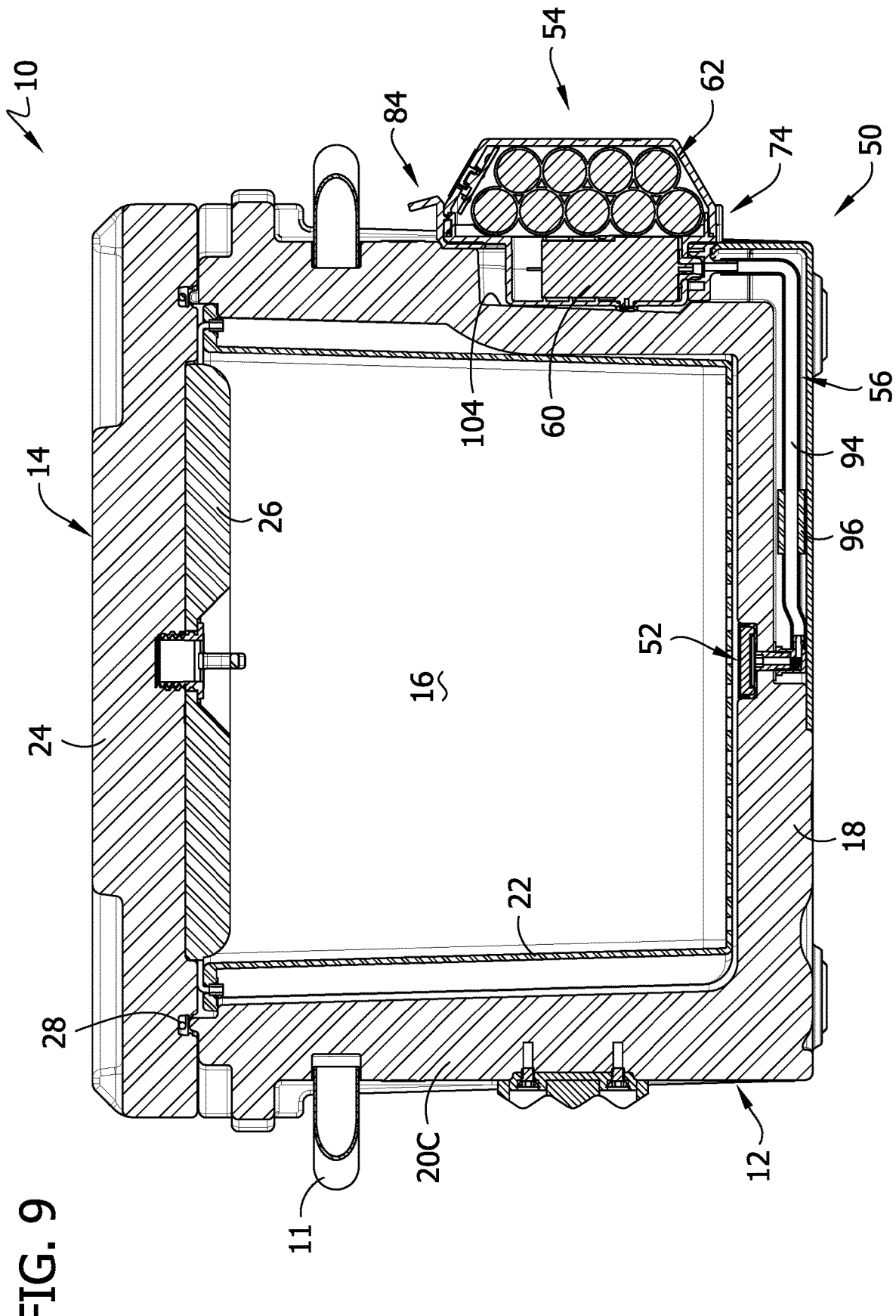
FIG. 9 a cross section of the container of FIG. 1.

Referring to FIGS. 7 and 8, another embodiment of a closure for a container of the present disclosure is generally indicated by 10. The container of FIGS. 7 and 8 is generally analogous to the container 10 of FIGS. 1-6 and, thus, for ease of comprehension, where similar, analogous or identical parts are used, identical reference numerals are employed. Accordingly, unless clearly stated or indicated otherwise, the descriptions herein regarding the container 10 of FIGS. 1-6 also apply to the container 10 of FIGS. 7 and 8.

In this embodiment, the closure includes two latches 30. The latches 30 of FIGS. 7 and 8 are analogous to the latch 30 of FIGS. 1-6. The latches 30 are part of a latch assembly

31. The latch assembly 31 is configured to secure the lid 14 in the closed position. It has been found that the lid body 24 may still warp for longer lengths L of the lid 14 even with a brace. In this case, to prevent the lid body 24 from warping, two or more latches 30 spaced apart along the length L are used to distribute the closing force. The two or more latches 30 can be used with or without the brace 40. In this embodiment, the latch assembly 31 includes a single handle 36 for operating the latches 30. Desirably, the handle 36 is the one and only handle of the latch assembly 31 required to be actuated for releasing/closing (e.g., operating) the latches 30. This way the latch assembly 31 can still be operated with one hand, for the reasons described above. The handle 36 is operatively connected to the latches 30 for releasing the latches (e.g., moving the latches between the securing and release configuration) to permit the lid 14 to move from the closed position toward the open position. The handle 36 is movable from a first position (see FIG. 1) to a second position (see FIG. 8) to release the latches 30. Movement of the handle 36 from the first position toward the second position results in the latches 30 moving from the securing configuration (FIG. 7) to the release configuration (FIG. 8). Specifically, the handle 36 is operatively connected to the cams 34 of the latches 30 such that movement of the handle relative to the lid 14 results in the cams of the latches moving relative to the lid (e.g., between the securing and release configurations). In the illustrated embodiment, the latch assembly 31 includes a connecting link 33 (broadly, linkage) interconnecting (e.g., extending between) the cams 34 of the latches 30. The connecting link 33 is fixed to the cams 34 such that the connecting link and cams rotated together. The handle 36 is mounted to (e.g., fixed to) the connecting link 33. As a result, moving (e.g., pivoting) the handle 36 between the first and second positions, results in corresponding movement (e.g., pivoting) of the connecting link 33, and thereby movement (e.g., pivoting) of the cams 34 between the securing and release configurations.

Referring back to FIGS. 1 and 2 and to FIGS. 9-15, the container 10 includes an aeration assembly or system 50 for delivering or supplying air to the interior 16 of the base 12. Specifically, the aeration system 50 delivers air to the water contained in the interior 16 of the base 12 to keep the oxygen levels of the water at a sufficient level to keep the aquatic bait alive. The aeration system 50 includes an air diffuser 52, a pump unit 54, and passaging 56 fluidly coupling the pump unit to the air diffuser. The air diffuser 52 is arranged to deliver air to the interior 16 of the base 12 to aerate water in the interior. The air diffuser 52 is attached to (broadly, a part of) the base 12. Specifically, the air diffuser 52 is recessed into the bottom wall 18. The air diffuser 52 can comprise an air stone or any other suitable device. In one embodiment, the air diffuser may simply be an open end of a conduit.

The pump unit 54 includes a housing 58 which contains the components of the pump unit. Desirably, the housing 58 is waterproof. In the illustrated embodiment, the housing 58 includes a first housing piece 58A and a second housing piece 58B attached to the first housing piece, such as with one or more fasteners, with a gasket there-between to create a waterproof seal. The pump unit 54 includes an air pump 60 and a battery 62 (broadly, a power source or a battery assembly containing one or more battery cells, such as rechargeable li-ion battery cells). The battery 62 is configured to power the pump unit, such as the air pump 60. The air pump 60 is configured to supply air. The pump unit 54 includes an air inlet 64 and an air outlet 66. The air inlet 64 and air outlet 66 are fluidly connected to the air pump 60 such that the air pump draws in air through the air inlet and expels air through the air outlet. The air inlet 64 and air outlet 66 are disposed on the exterior of the housing 58. The air inlet 64 is arranged to permit air from the ambient environment surrounding the housing 58 to be drawn therethrough by the air pump 60. Desirably, the pump unit 54 forms an enclosed air flow path from the air inlet 64 to the air outlet 66. As a result, the air pump 60 does not draw in any air from within the housing 58 itself, unlike conventional arrangements. This allows the housing 58 to be air-tight and waterproof. The air inlet 64 may be defined by an opening in the housing 58 (e.g., first housing piece 58A). In one embodiment, the air pump 60 includes an intake port 60A aligned within the air intake 64. A gasket, such as an O-ring, is positioned between the intake port 60A (broadly, the pump 60) and the first housing piece 58A to create a water tight seal there-between and maintain the waterproofing of the housing 58. In one embodiment, the housing 58 includes a pressure relief vent (not shown) arranged to relieve pressure from the interior of the housing by permitting air to escape out of the housing through the pressure relief vent. Operation of the air pump 60 can increase the pressure within the housing 58 such that it becomes necessary to relieve the pressure, via the pressure relief vent. The pressure relief vent permits one-way travel (e.g., includes a one-way valve) to as to not let water or other debris into the housing 58.

The pump unit 54 is a self-contained unit. The pump unit 54 includes a control system 68 for controlling the operation of the pump unit 54 (e.g., air pump 60). The control system 68 may include a controller 70 (e.g., a CPU or processor and corresponding control circuitry) and RAM or memory (broadly, non-transitory computer-readable storage medium). The controller 70 provides the computing engine that drives the operation of the pump unit 54. Broadly, the memory includes (e.g., stores) processor-executable instructions for controlling the operation of the controller 70. The instructions embody one or more functional aspects of the pump unit 54, as described herein, with the controller 70 executing the instructions to perform said one or more functional aspects. The control system 68 also includes a user interface 72, such as a display and button, touch-screen display, etc., for receiving user input and displaying information to the user. The controller 70 is communicatively coupled to and responsive to the user interface 72. The user interface 72 can receive instructions or user input from a user, with the controller 70 carrying out the instructions. Likewise, the user interface 72 can display information to the user. The user interface 72 may include a power (e.g., on/off) button or switch and/or a batter level indicator. The power button may also serve as a setting button for cycling through different air pump modes, such as high airflow, medium airflow, low airflow, interval air flow, etc. For example, the first actuation of the power button may turn the pump unit on and operate the air pump at a high airflow setting, another actuation of the power button may change the air pump to operate at a medium airflow setting, another actuation of the power button may change the air pump to operate at a low airflow setting, another actuation of the power button may change the air pump to operate at an interval airflow setting, and another actuation of the power button may change the air pump to operate back at the high airflow setting and so on. In one embodiment, the pump unit 54 is turned off by pressing and holding the power button. The pump unit 54 may include a charging port for recharging the battery 62. The pump unit 54 may include a charging port cover (not shown) to cover and seal the charging port.

Other configurations of the control system are within the scope of the present disclosure.

Figure 15:
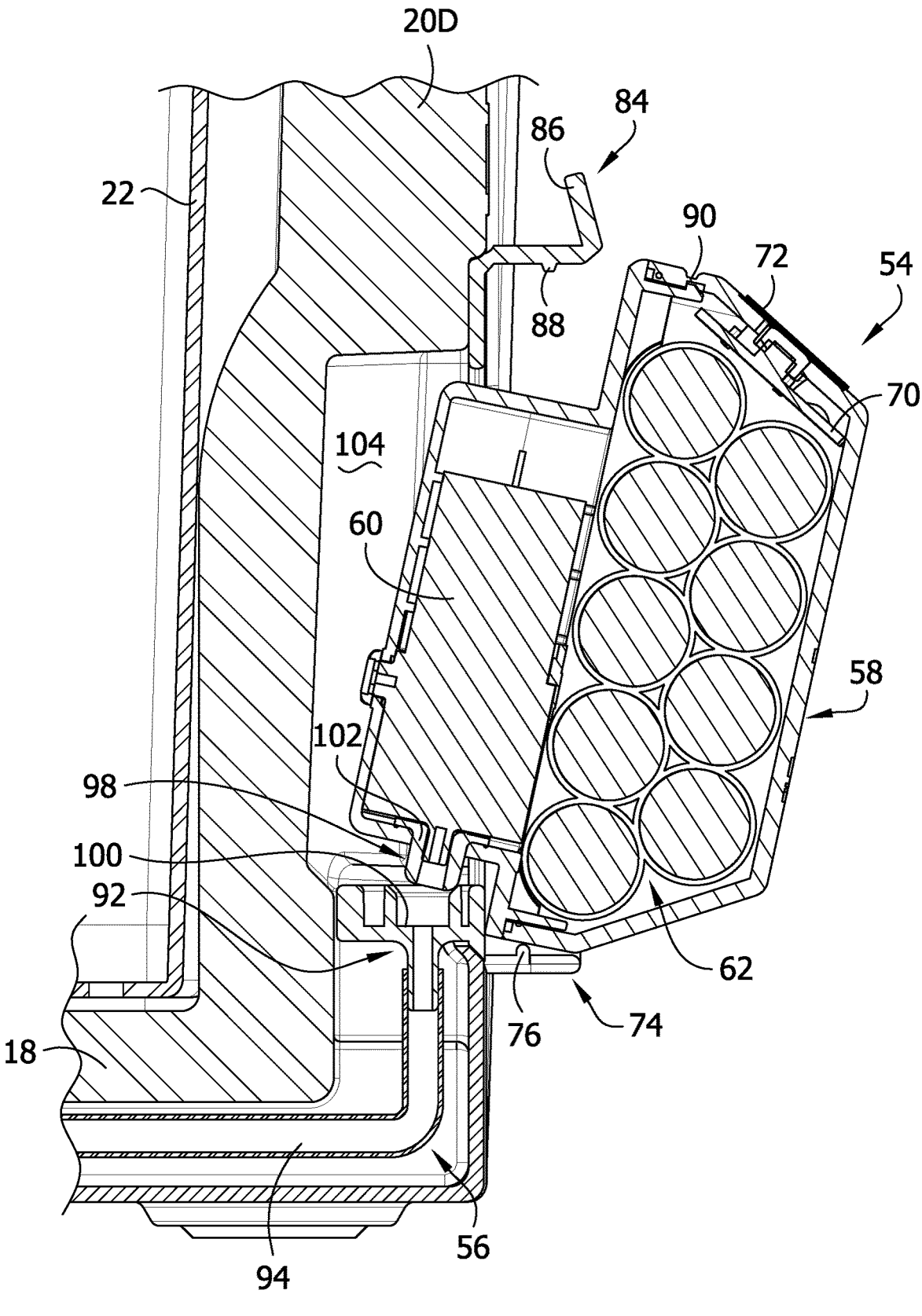
FIG. 15 is an enlarged cross section view of the pump unit being attached to the mount of the container of FIG. 1.
Figure 16:
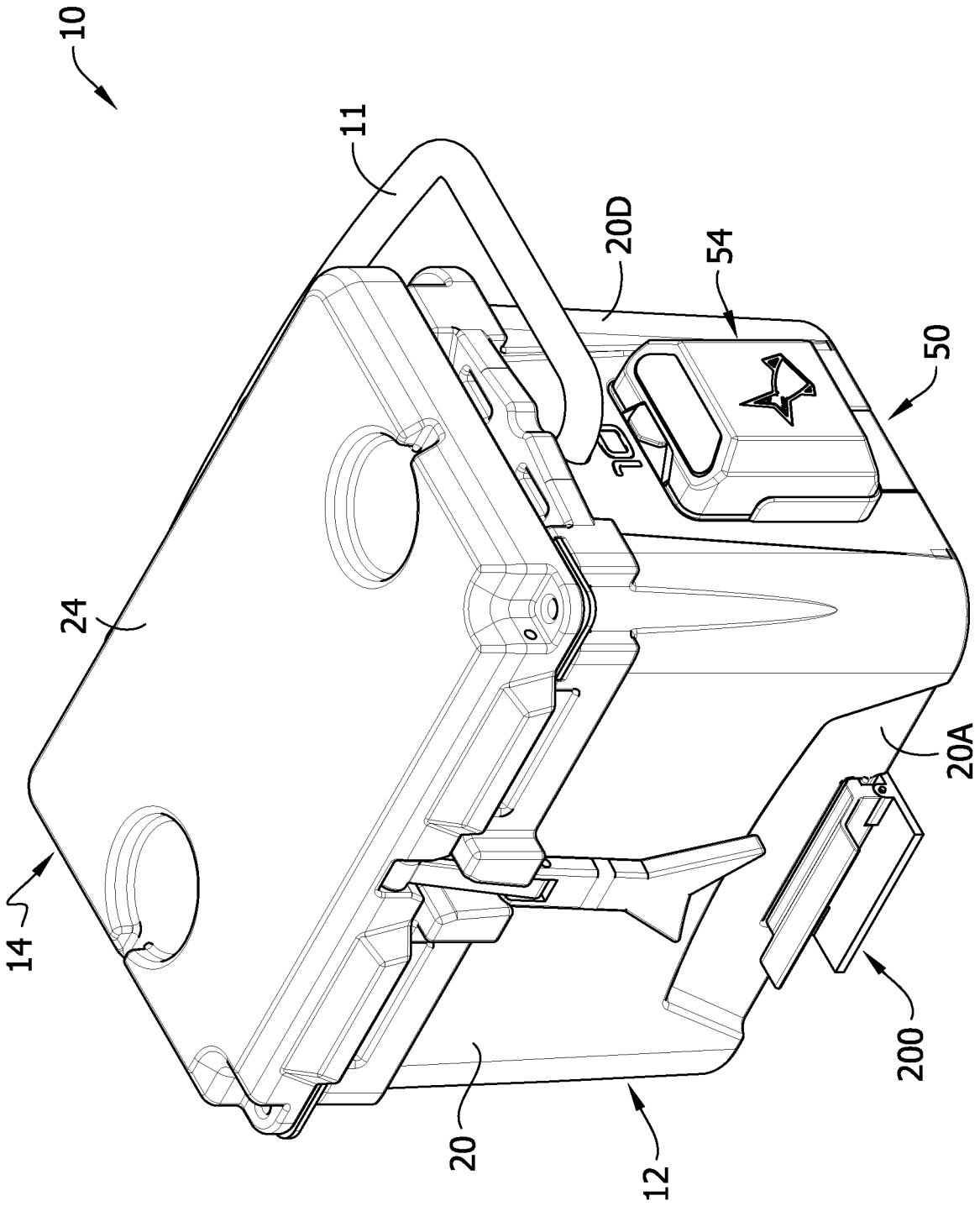
FIG. 16 is a perspective of the container of FIG. 1 coupled to a container mount.
Figure 17:
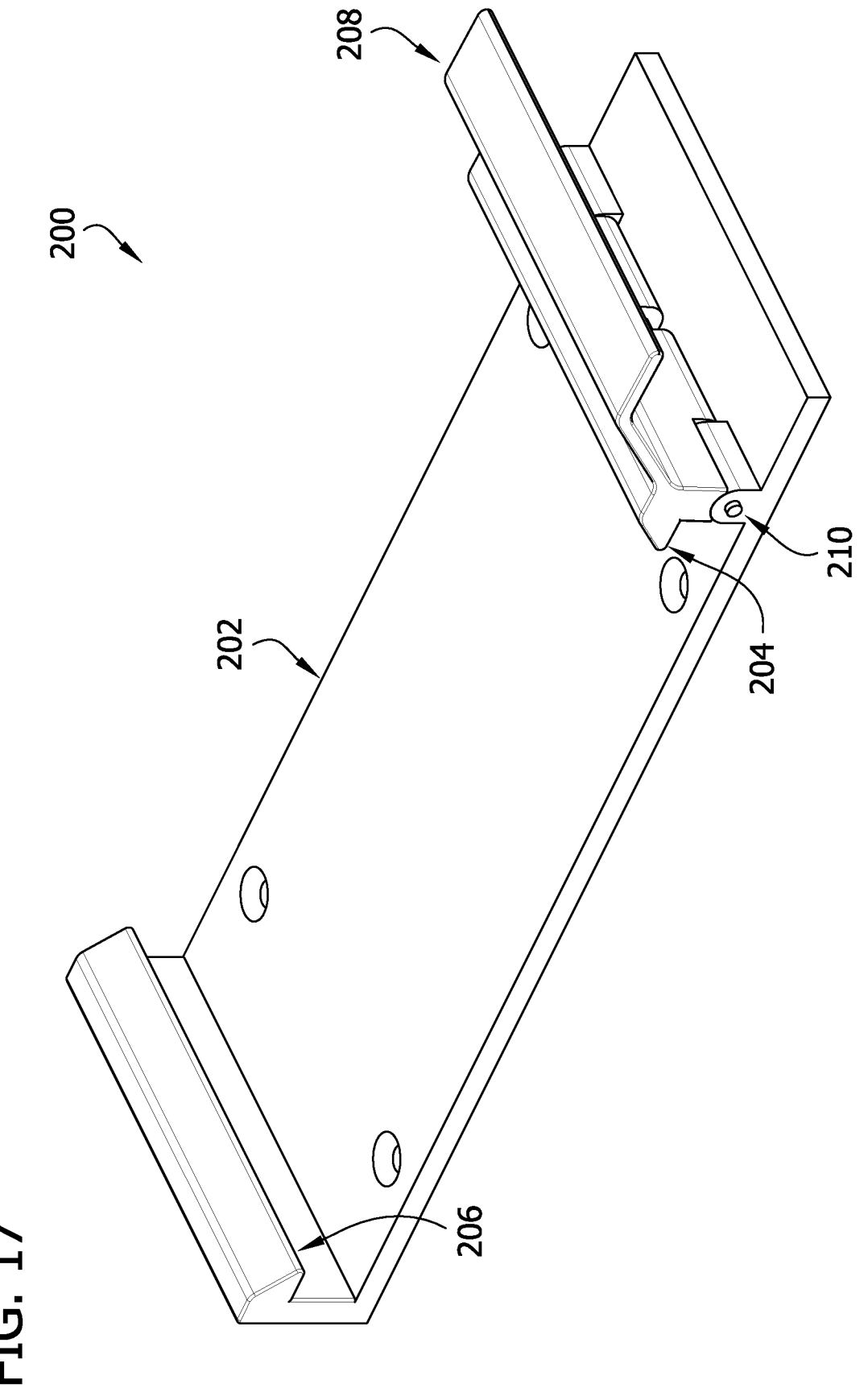
FIG. 17 is a perspective of the container mount.

The pump unit 54 is removably connectable or mountable to the base 12. The base 12 includes a pump unit mount or receiver 74 that removably connects or couples to the pump unit 54. The illustrated pump unit mount 74 comprises a mounting bracket secured to the exterior of the sidewall 20 (e.g., the right sidewall 20D), such as with one or more fasteners. The pump unit 54 is manually and readily connectable and disconnectable from the pump unit mount 74 without the use of tools. This allows the pump unit 54 to be easily removed from the base 12, such as for recharging the battery 62, and then easily reconnected. In the illustrated embodiment, the pump unit mount 74 includes mating projections or protrusions 76 (broadly, retainers) that mate with corresponding retaining grooves or recesses 78 of the housing 58 of the pump unit. Each retaining recess 78 is sized, shaped, and arranged to receive one of the mating projections 76 when the pump unit 54 is removably connected to the base 12. In other embodiments, the pump unit mount may include the retaining recesses and the pump unit may include the mating projections (broadly, one of the pump unit mount or the pump unit includes the mating projection and the other of the pump unit mount or the pump unit includes the mating recess). The pump unit mount 74 includes a lower wall 80 for supporting the pump unit 54. The pump unit mount 74 may also include supporting side walls 82 extending up from the lower wall 80 to better secure the pump unit 54 when coupled to the pump unit mount 74 (e.g., prevent the pump unit from moving forward and rearward relative to the pump unit mount). The pump unit mount 74 includes a resiliently deformable retainer 84 configured to secure the pump unit 54 to the base 12. The resiliently deformable retainer 84 is configured to be deformed by the pump unit 54 from an at rest position (as shown in FIG. 15) to a deformed position and then move generally back toward the at rest position to a retaining position to secure the pump unit to the base when the pump unit is being connected to the pump unit mount 74. The at rest position and the retaining position of the resiliently deformable retainer may be generally the same. In the illustrated embodiment, the resiliently deformable retainer 84 comprises a clip arranged to engage the pump unit 54 to secure the pump unit to the base 12. In the illustrated embodiment, the clip 84 comprises a manually operable tension snap clip. The clip 84 includes a thumb release tab 86 for manual engagement to deflect the clip to easily remove the pump unit 54 from the pump unit mount 64. The clip 84 includes a keeper 88 that engages (e.g., mates) with the housing 58 of the pump unit 54 to secure the pump unit to the pump unit mount 74. The keeper 88 mates with a corresponding keeper groove or recess 90 of the housing 58. Pushing the thumb release tab 86 to deflect the clip 84 moves the keeper 88 out of the keeper recess 90, permitting pump unit 54 to be removed from the pump unit mount 74. When coupling the pump unit 54 to the pump unit mount 74, the pump unit engages and deflects the clip 84 generally upward from the at rest state to a deformed state. This allows the pump unit mount 74 to receive the pump unit 54. Once the keeper 88 aligns with the keeper recess 90 of the housing 58, the clip 84 returns toward the at rest position, thereby moving the keeper into the keeper recess to secure the pump unit 54 to the pump unit mount 74.

Figure 10:
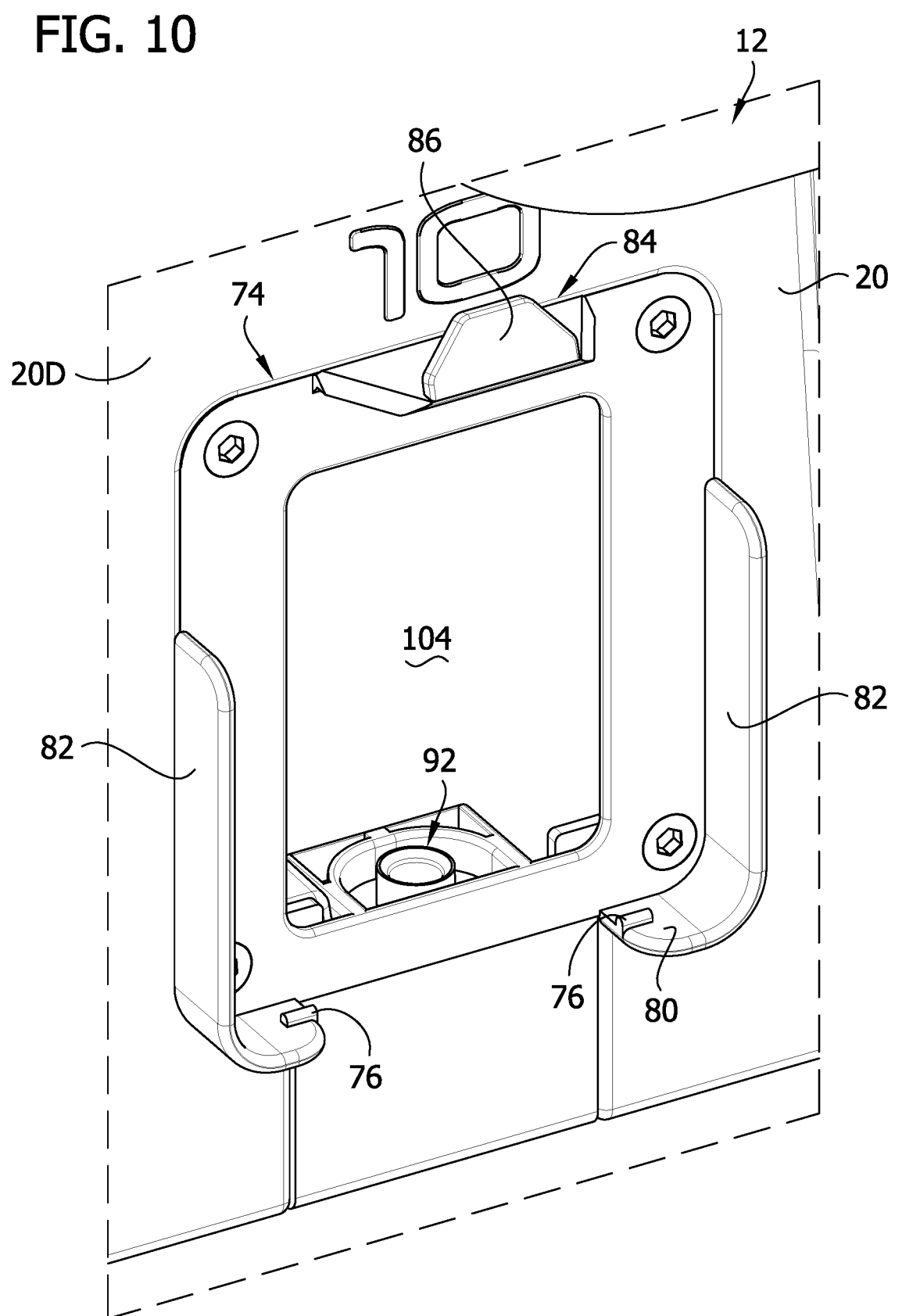
FIG. 10 is an enlarged perspective of a mount for a pump unit of the container of FIG. 1.
Figure 11:
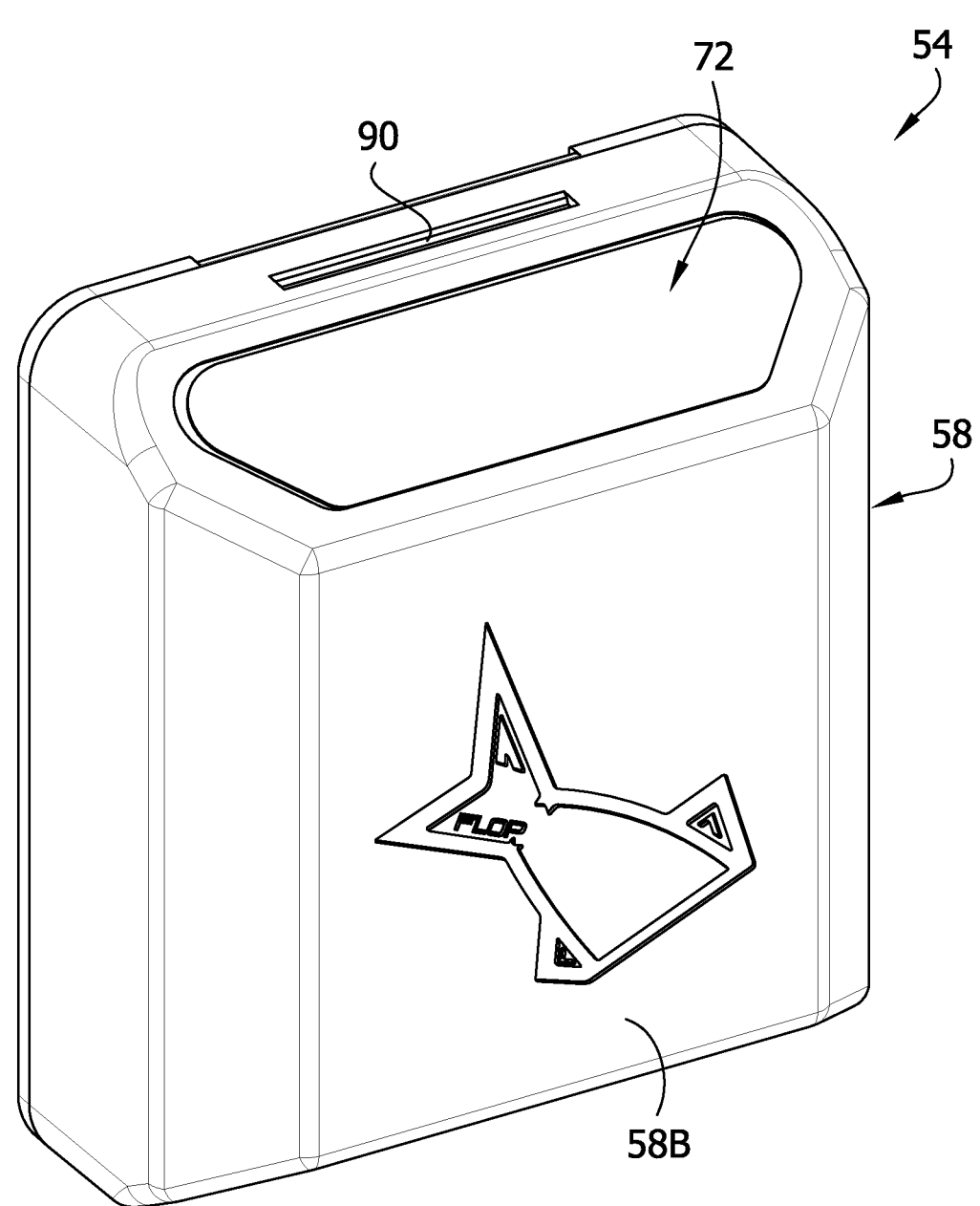
FIG. 11 is a front perspective of the pump unit.
Figure 12:
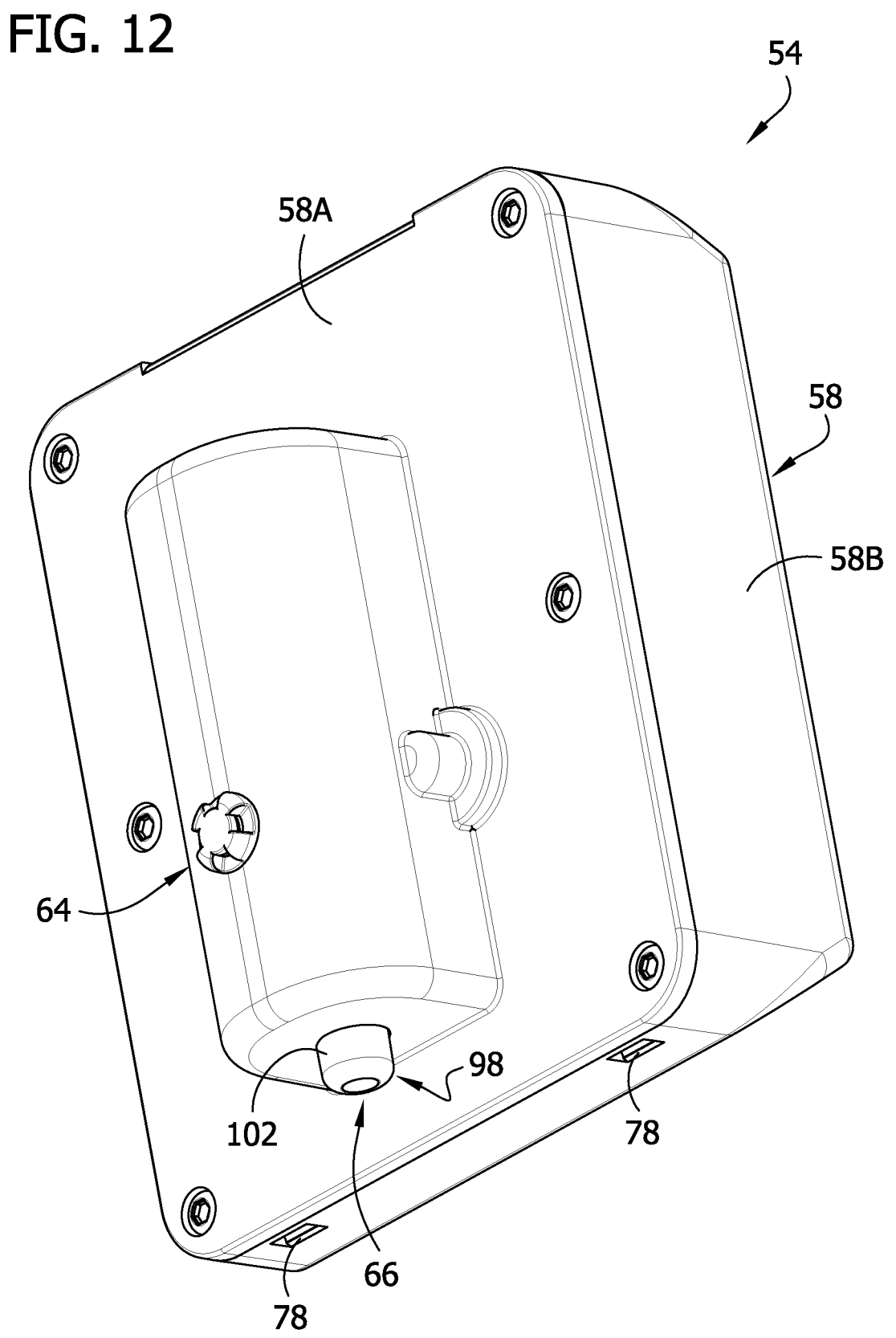
FIG. 12 is rear perspective of the pump unit.
Figure 13:
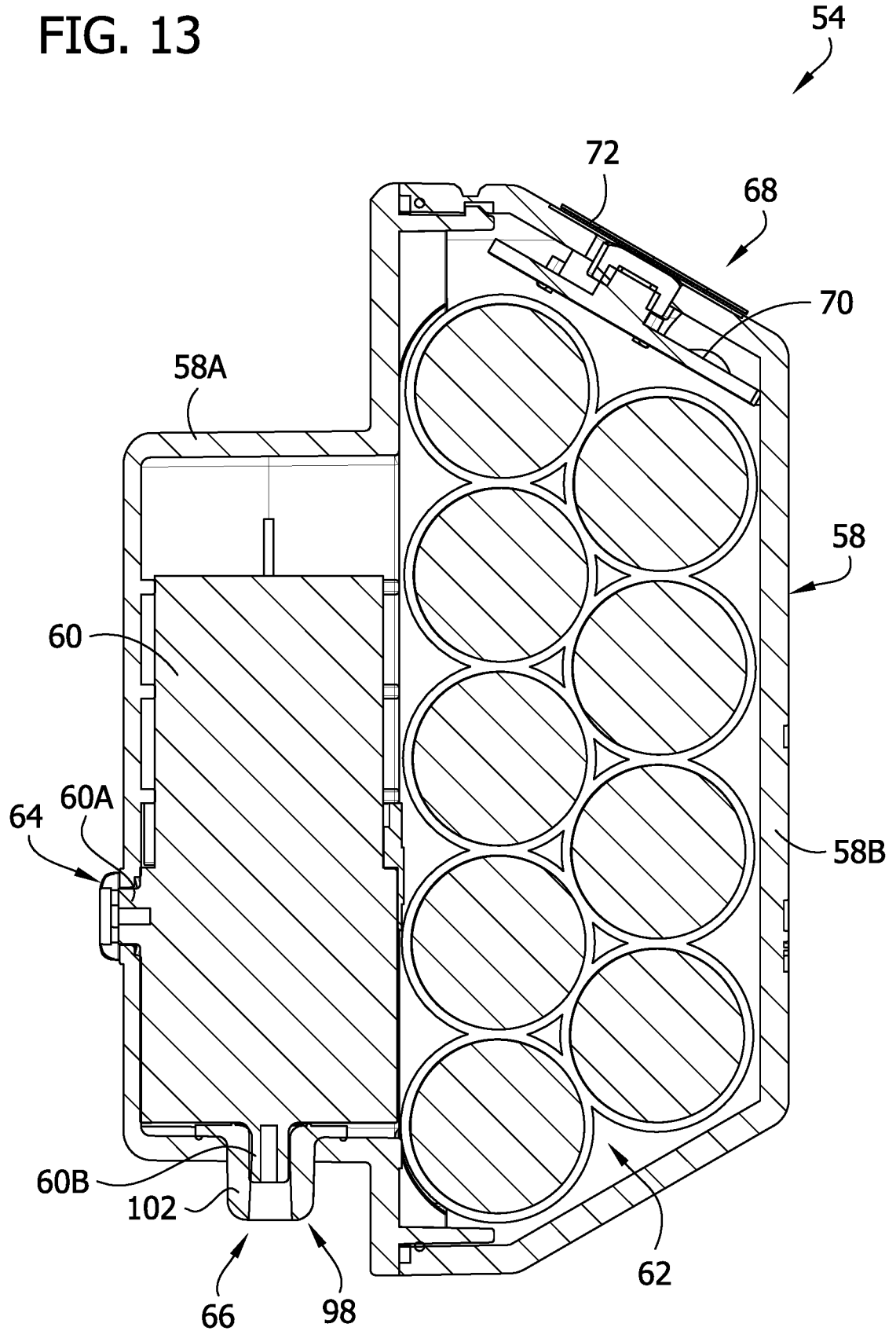
FIG. 13 is cross section of the pump unit.
Figure 14:
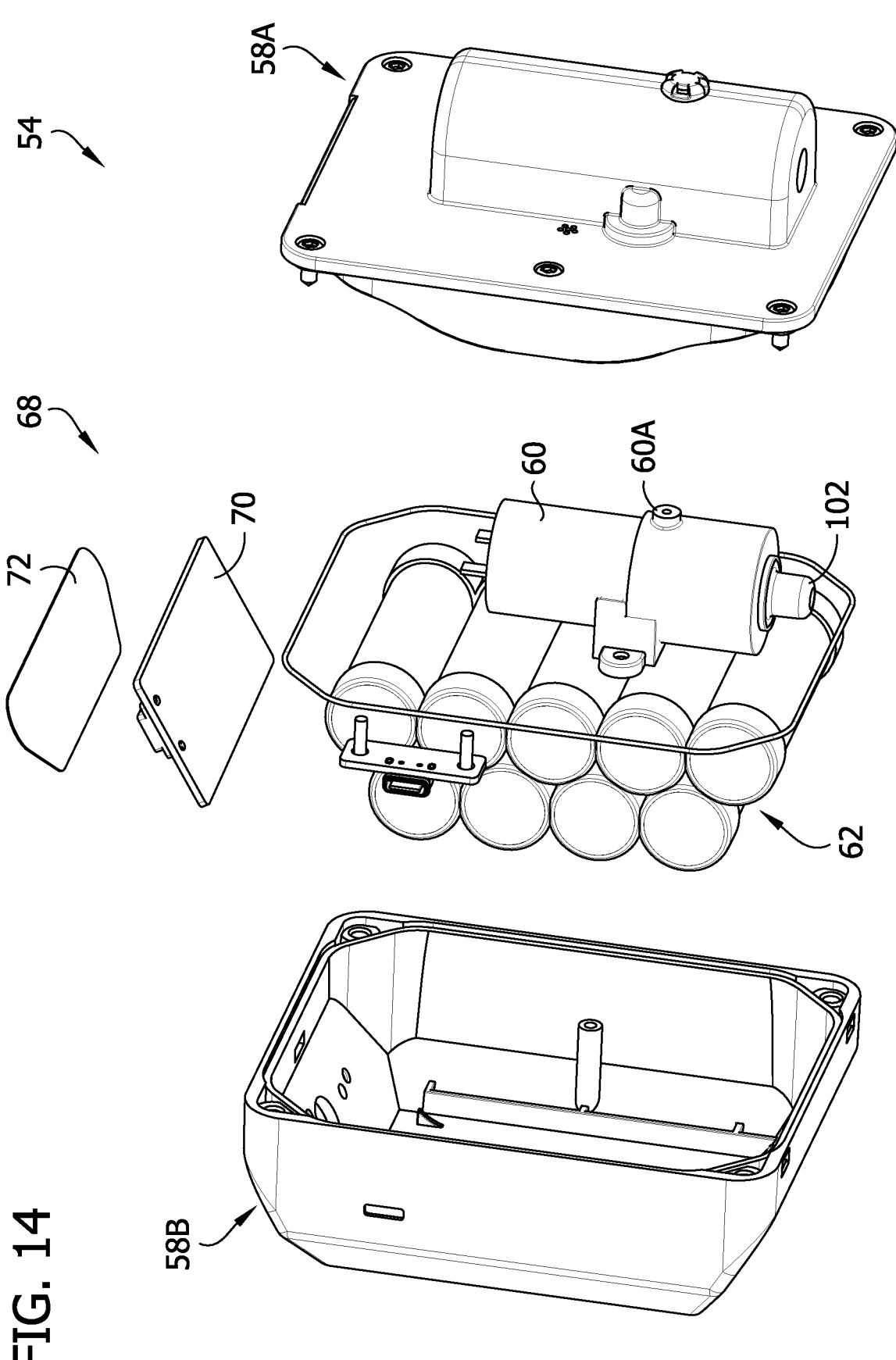
FIG. 14 is an exploded view of the pump unit.

The pump unit mount 74 (broadly, the base 12) includes a first air connection fitting 92 (FIG. 10). The first air connection fitting 92 is fluidly coupled to the air diffuser 52. The passaging 56 includes a conduit 94 (e.g., tube) extending from the first air connection fitting 92 to the air diffuser 52. A one-way valve 96, such as a check valve, is positioned along the conduit 94 to inhibit water from the interior 16 from flowing out of the interior and into the pump unit 54 via the passaging 56. The passaging 56 (e.g., conduit 94) extends along and within the sidewall 20 and the bottom wall 18 between the first air connection fitting 92 and the air diffuser 52. The pump unit 54 includes a second air connection fitting 98 (FIG. 12). The second air connection fitting 98 defines the air outlet 66 of the pump unit 54. Accordingly, the second air connection fitting 98 is fluidly coupled to the air pump 60. The second air connection fitting 98 is configured to couple to (e.g., mate with) the first air connection fitting 92 when the pump unit 54 is connected to the base 12 to fluidly couple the air pump 60 to the air diffuser 52 to supply air for the air diffuser. The coupling of the first and second air connection fittings 92, 98 allows air to flow from the pump unit 54 (e.g., air pump 60) into the interior 16 of the base 12 via the passaging 54 and the air diffuser 52. One of the first air connection fitting 92 or the second air connection fitting 98 comprises a male connection fitting and the other of the first air connection fitting or the second air connection fitting comprises a female connection fitting configured to receive the male connection fitting (e.g., the male connection fitting is inserted into the female connection fitting). In the illustrated embodiment, the first air connection fitting 92 comprises the male connection fitting and the second air connection fitting 98 comprises the female connection fitting. One of the first air connection fitting 92 or the second air connection fitting 98 comprises a sealing surface 100 and the other of the first air connection fitting or the second air connection fitting comprises a resiliently deformable sealer 102, such as a rubber nipple, gasket, or the like. The sealer 102 is arranged to engage and form an air tight seal with the sealing surface 100 when the pump unit 54 is connected to the base 12. Engagement of the sealer 102 with the sealing surface 100 may deform (e.g. slightly compress) the sealer to create the air tight seal. In the illustrated embodiment, the first air connection fitting 92 includes the sealing surface 100 and the second air connection fitting 98 includes the resiliently deformable sealer 102. In the illustrated embodiment, the air pump 60 includes an outlet port 60B (FIG. 13) aligned with in the air outlet 66. The sealer 102 also includes a flange positioned between the outlet port 60B (broadly, the pump 60) and the first housing piece 58A to create a water tight seal there-between and maintain the waterproofing of the housing 58.

In the illustrated embodiment, the first air connection fitting 92 is part of the pump unit mount 74. In other embodiments, the first air connection fitting may be separate from the pump unit mount. The first air connection fitting 92 has a cylindrical side wall sized and shaped to receive the sealer 102 therein. The cylindrical side wall may be dimensioned slightly smaller than the diameter of the resiliently deformable nipple to compress the nipple in the pneumatic connection to form a seal between the nipple and cylindrical side wall. In this case, the cylindrical side wall may be referred to as a sealing surface. The side wall extends upward from the lower sealing surface 100. The mouth of the fitting 92 includes a guide comprising an annular ramp (broadly, a ramp or guide) configured to guide the fitting 98 into the mouth of the fitting 92. The mouth is larger in diameter than the cylindrical side wall and directs the fitting 98 to be received in the space bound by the cylindrical side wall. The guide is arranged to guide the sealer 102 toward the sealing surface 100 as the pump unit 54 is coupled to the pump unit mount 74. The ramp helps reduce any pinching that may occur between the sealer 102 and the pump unit mount 74 (e.g., first air connection fitting 92) as the pump unit 54 is being attached to the pump unit mount, thereby ensuring the air tight connection between the first and second air connection fittings 92, 98.

The sidewall 20 (e.g., right sidewall 20D) has an exteriorly facing sidewall recess 104. The first air connection fitting 92 is disposed near the bottom of the sidewall recess 104. The pump unit mount 74 is adjacent (e.g., disposed around) the sidewall recess 104. When the pump unit 54 is connected to the pump unit mount 74, the air pump 60 is generally disposed in the sidewall recess 104 and the battery 62 and user interface 72 are disposed outside of the sidewall recess. By receiving at least a portion of the pump unit 54, the sidewall recess 104 maintains the compact design of the container 10. It is understood the sidewall recess may be sized and shaped to receive the entire pump unit. Further, the air inlet 64 of the pump unit 54 is arranged to face the base 12 (e.g., sidewall 20) when the pump unit is removably connected to the base. Specifically, the air inlet 64 is arranged such that it is disposed in the sidewall recess 104 when the pump unit 54 is removably connected to the base 12. This arrangement protects the air inlet 64 and inhibits dust and other debris from the surrounding environment from being drawn into the air inlet, and thereby the air pump 60. This prolongs the life the air pump 60.

Referring to FIG. 15, the pump unit 54 is configured to form a mechanical mounting connection with the pump unit mount 74 generally simultaneously with the formation of a pneumatic connection between the first and second air connection fittings 92, 98 when the pump unit is removably connected to the pump unit mount. In the illustrated embodiment, the pump unit 54 can be connected to the pump unit mount 74 by locating the bottom end of the pump unit to engage the pump unit mount (e.g., lower wall 80 thereof), as shown in FIG. 15. This aligns and may at least partially mate the mating projections 76 with the retaining recesses 78. The pump unit 54 can then be pivoted, about the lower wall 80, toward the sidewall 20, until the upper end of the pump unit engages the pump unit mount 74. As the pump unit 54 is pivoted, the second air connection fitting 98 moves (e.g., pivots) into engagement with the first air connection fitting 92, to form the air tight connection there-between. The sealer 102 engages the sealing surface 100 to complete the pneumatic connection. At generally the same time, the keeper 88 of the clip 84 moves into the keeper recess 90 of the pump unit 54, thereby securing the pump unit to the pump unit mount 74 and completing the mechanical mounting connection. When the first and second air connection fittings 92, 98 are mated together, the air outlet 66 of the pump unit 54 is aligned with a corresponding air inlet of the passaging 56 (e.g., of the first air connection fitting), thereby allowing air to flow from the air pump 60, through the air connection fittings, into the passaging, and out the air diffuser 52 into the interior 16. The one or more vents (described above), allows air to escape the interior 16 to prevent pressure from building up in the interior when the lid 14 is in the closed position while the air pump 60 is operating. It will be appreciated that a mounting connection and a pneumatic connection is formed between the pump unit 54 and the container assembly by the user grasping the pump unit and moving it into position without requiring separate manual connection of hoses, fasteners, etc.

Referring to FIGS. 1, 2, and 16-19, one embodiment of a container mount or dock (e.g., securing assembly) for the container 10 of the present disclosure is generally indicated at reference numeral 200. Together, the container 10 and the container mount 200 form a container assembly. In the illustrated embodiment, the base 12 of the container 10 includes connection recesses 106 adjacent the bottom of the base. The front sidewall 20A includes a first connection recess 106 adjacent the lower end of the front sidewall and the rear sidewall 20B includes a second connection recess 106 adjacent the lower end of the rear sidewall. The container mount 200 is configured to engage the connection recesses 106 to couple and secure the container 10 to the container mount. It is understood the container mount may engage other features of the container 10 instead of the connection recesses 106, such as a lip or shoulder thereof.

Figure 18:
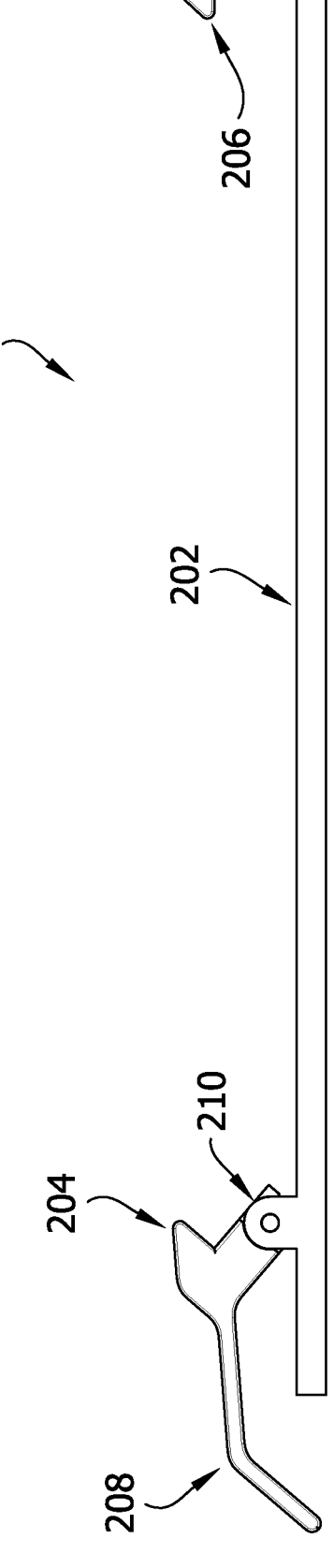
FIG. 18 is a side elevation of the container mount, the container mount in a release configuration.
Figure 19:
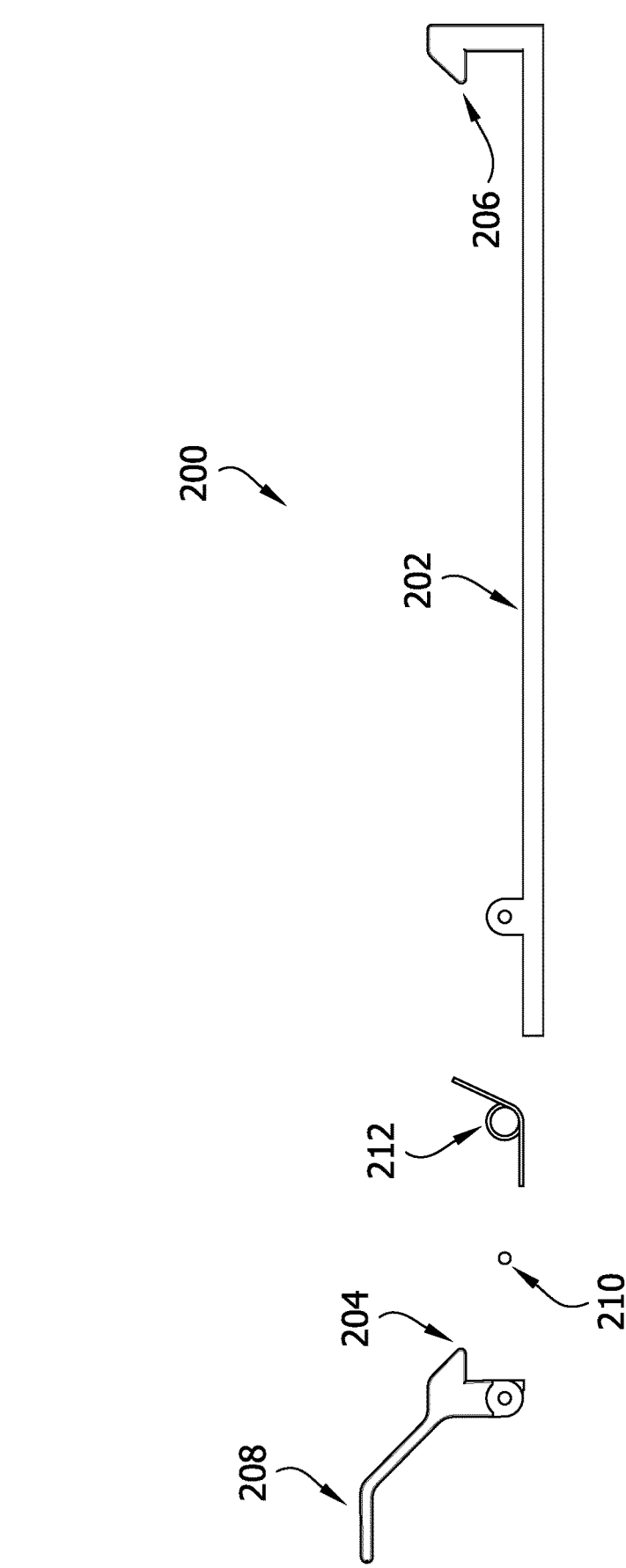
FIG. 19 is an exploded view of the container mount.

The container mount 200 is used to secure the container 10 in place (e.g., hold the container at a fixed location). It will be appreciated that the container mount 200 can be used with other types of containers (e.g., cooler, tackle box, tool box, etc.). The container mount 200 includes a base 202, a first retainer or lip 204, and a second retainer or lip 206. The base 202 supports the first and second retainers 204, 206. The base 202 of the container mount 200 can be secured to generally any surface (e.g., mounting surface). In one embodiment, the base 202 is secured to a mounting surface with one or more fasteners (e.g., bolts, screws, self-tapping screws, hand screws, nails, etc.) extending through the base. Other ways of securing the base to the mounting surface, such as via glue, adhesive strips, or epoxy, are within the scope of the present disclosure. The base 202 can be mounted to any desired surface such as boat decks, truck beds, work platforms, etc. The first and second retainers 204, 206 are sized, shaped, and arranged to mate with the corresponding connection recesses 106 of the container 10 (broadly, engage the container) to hold the container securely to the container mount 200. Each retainer 204, 206 is configured to mate with (e.g., be received by) one of the connection recesses 106 (see FIG. 16) on opposite sides of the base 12 of the container 10, thereby coupling the container to the container mount 200. The first retainer 204 is movable relative to the base 202 and the second retainer 206 is fixed relative to the base. The first retainer 204 is movable between a securing position (FIG. 17) and a release position (FIG. 18). In the securing position, the first retainer 204 is arranged to engage the container 10 (e.g., be disposed in one of the connection recesses 106) to couple and secure the container to the container mount 200. In the securing position, the first and second retainers 204, 206 are arranged such that they both engage the container 10 (e.g., are both disposed in one of the connection recesses 106). With the first retainer 204 in the securing position, and the container 10 disposed between the first and second retainers 204, 206, the container is inhibited from moving relative to the container mount 200. In the release position, the first retainer 204 is arranged to not be engaged with the container 10 (e.g., be disposed out of the connection recess 106) to permit the container to move relative to the container mount 200. Therefore, moving the first retainer 204 to the release position permits the container 10 to be removed from and placed on the container mount 200.

The container mount 200 keeps the container 10 (or other suitable object or device) held in place by the use of a self-closing system, which desirably has the ability to be released without the use of a person's hands. The container mount 200 includes a foot pedal 208 operatively connected to the first retainer 204. The foot pedal 208 is arranged to be actuated (e.g., pressed by) a user's foot to move the first retainer 204 from the securing position to the release position to release the container 10 from the container mount 200, resulting in hands free operation of the container mount. The foot pedal 208 is pivotably coupled to the base 202 via a pivot pin or shaft 210 (broadly, a hinge). A spring 212 (e.g., tension spring) biases the first retainer 204 toward the securing position. The spring 212 also biases the foot pedal 208 toward an upper position, thereby positioning the food pedal to be pressed by the user's foot. The first retainer 204 is coupled to and moves with the foot pedal 208 (e.g., the foot pedal includes the first retainer). To secure the container 10 to the container mount 200, the container is set down on top of the base 202, thereby moving the first retainer 204 toward the release position, to permit the container to move between the first and second retainers 204, 206. The first retainer 204 and/or second retainer 206 may include an inclined or angled upper surface, as illustrated, arranged to be engaged by the container 10 to guide the insertion of the container between the retainers. Further, the upper angled surface of the first retainer 204 facilitates the movement of the first retainer toward the release position by the container 10 when the container is set down on top of the base 202. As the container 20 is set down on the base 202, the container automatically cams the first retainer 204 toward the release position by engagement with the first retainer (e.g., angled upper surface thereof). When the first and second retainers 204, 206 align with the corresponding connection recesses 106 of the container 10, the first retainer automatically snaps back toward the securing position (via the spring 212), thereby securing the container to the container mount 200 and holding the container in to place. To release the container 10 from the container mount 200, the user presses down on the foot petal 208, which moves the first retainer 204 out of engagement with the container 10 (e.g., away from the second retainer 206) and thereby allowing the user to lift the container out of the container mount. In one embodiment, the container mount 200 includes a pad lock receiver (not shown) which can receive a pad lock (broadly, generally any type of lock) to inhibit the first retainer from pivoting toward the release position to prevent the theft of the container 10 secured to the container mount. For example, the pad lock receiver can be a set of aligned openings in the base 202 and the foot pedal 208 through which the pad lock extends to inhibit the foot pedal from pivoting relative to the base.

Referring to FIGS. 20 and 21, an aeration assembly or system for a container 302 according to one embodiment of the present disclosure is generally indicated at reference numeral 300. The aeration assembly 300 of FIGS. 20 and 21 is similar to the aeration system 50 of FIGS. 1-15, and, thus, for ease of comprehension, where similar, analogous, or identical parts are used, identical reference numerals are employed. Accordingly, unless clearly stated or indicated otherwise, the above descriptions regarding the aeration system 50 of FIGS. 1-15 also apply to the aeration assembly 300 of FIGS. 20 and 21. For example, the pump unit 54 of FIGS. 1-15 can be the pump unit used in (e.g., be identical to the pump unit of) the aeration assembly 300 of FIGS. 20 and 21.

The aeration assembly 300 is configured to be used with a wide variety of containers 302 to aerate the water held by the container. In the illustrated embodiment, the container 302 comprises a bucket (e.g., a 5-gallon bucket), although other types of containers are within the scope of the present disclosure such as coolers, fish tanks, garbage cans, and the like. The aeration assembly 300 transforms any container suitable for holding water into a bait container suitable for holding and maintaining live bait by aerating the water contained in the container to keep the oxygen levels in the water sufficient to sustain the live bait.

The aeration assembly 300 includes a pump unit 54 and a pump unit mount 74. The pump unit mount 74 includes a mounting bracket 74A and a mounting housing 74B. The mounting bracket 74A can include mounting structure identical to the mounting bracket described above in reference to FIGS. 1-15. For example, the mounting bracket 74A includes a lower wall 80, side walls 82, mating projections 76, a resiliently deformable retainer 84, and a first air connection fitting 92. The mounting bracket 74A is secured to a front of the mounting housing 74B with one or more fasteners. The mounting housing 74B defines a cavity or recess 306. The first air connection fitting 92 is disposed near the bottom of the recess 306. When the pump unit 54 is connected to the pump unit mount 74, the air pump 60 is generally disposed in the recess 306 and the battery 62 and user interface 72 are disposed outside of the recess. It is understood the recess may be sized and shaped to receive the entire pump unit.

In the illustrated embodiment, the mounting housing 74B (broadly, the pump unit mount 74) includes a container connector 308 configured to attach the pump unit mount 74 to the container 300. The container connector 308 may removably or permanently attach the pump unit mount 74 to the container 300. The container connection 308 may comprise one or more of an adhesive (e.g., an adhesive pad positioned on a rear of the mounting housing 74B), such as a pressure sensitive adhesive, one or more suction cups, one or more fastener openings for receiving fasteners to fasten the pump unit mount to a container, a hook arranged to hook onto the container (such as by hooking over a lip of the container), and/or a clip for clipping onto the container. Other suitable container connectors are within the scope of the present disclosure. In the illustrated embodiment, a rear surface of the mounting housing 74B is curved to match the curve of the cylindrical wall of a bucket. The rear surface can have other configurations, such as flat. In some embodiments, all or a portion of the pump unit mount 74 may be part of (e.g., integrally formed with) the container, such as be part of a sidewall (broadly, base) of the container or a lid of the container. For example, in some embodiments the mounting housing 74B may be part of the container (e.g., sidewall or lid) with the mounting bracket 74A secured thereto with the one or more fasteners, similar to the mounting bracket secured to the sidewall 20 in FIGS. 1-15.

The pump unit mount 74 (e.g., the mounting housing 74B) includes an air outlet port 310. The air outlet port 310 is part of the passaging 56. The air outlet port 310 defines an air outlet through which air is expelled when the pump unit 54 is connected to the pump unit mount. The first air connection fitting 92 and the air outlet port 310 are fluidly coupled together via the passaging 56. The passaging 56 may include a conduit (not shown) extending from the first air connection fitting 92 to the air outlet port 310. The passaging 56 may include a one-way valve (not shown), such as a check valve, positioned along the conduit, between the air outlet port 310 and the first air connection fitting 92, to inhibit water from the container 302 from flowing into the pump unit 54. The one-way valve prevents any water from inadvertently reaching and potentially damaging the air pump of the pump unit 54. The air outlet port 310 is configured to be connected to a conduit or tube 304 (e.g., flexible conduit or tube). For example, the air outlet port 310 may comprise a hose barb fitting. The aeration assembly 300 may include an air diffuser 52 and the conduit 304. The conduit 304 fluidly couples the air diffuser to the pump unit 54. The conduit 304 may be considered part of the passaging 56. After the pump unit mount 74 is attached to the container 302, the air diffuser 52 can be simply placed or laid in the interior of the container, with the conduit 304 extending back out of the interior, such as through the open top and over the container's lip, toward the pump unit mount. In one embodiment, the air diffuser 52 and the conduit 304 may be provided by an end user.

Referring to FIGS. 22 and 23, an aeration assembly or system according to one embodiment of the present disclosure is generally indicated at reference numeral 400. The aeration assembly 400 of FIGS. 22 and 23 is similar to the aeration assembly 300 of FIGS. 20 and 21, and, thus, for ease of comprehension, where similar, analogous, or identical parts are used, identical reference numerals are employed. Accordingly, unless clearly stated or indicated otherwise, the above descriptions regarding the aeration assembly 300 of FIGS. 21 and 22 also apply to the aeration assembly 400 of FIGS. 22 and 23. For example, the pump unit 54 of FIGS. 20 and 21 (and therefore also FIGS. 1-15) can be the pump unit used in (e.g., be identical to the pump unit of) the aeration assembly 400 of FIGS. 22 and 23.

The aeration assembly 400 is configured to be used with just about any kind of object O to provide aeration (not just containers). In this embodiment, the mounting housing 74B of the pump unit mount 74 acts primarily as a spacer to offset or separate the mounting bracket 74A from the object to which the mounting housing is attached. The mounting housing 74B creates the recess 306 to permit the pump unit 54 to be connected to the mounting bracket 74A. The fasteners used to connect the mounting bracket 74A to the mounting housing 74B may also be used to connect the mounting housing to the object. Other ways of attaching the mounting housing 74B to the object, such as adhesive, suction cups, hook, etc., could also be used. In this embodiment, the mounting bracket 74A defines the air outlet port 310 that connects to the conduit 304 (not shown in FIGS. 22 and 23). A one-way valve may be present in this embodiment. The mounting housing 74B includes an opening or slot 402 at the lower end thereof to provide room for the first air connection fitting 92 and air outlet port 310. Other configurations are within the scope of the present disclosure. For example, instead of the mounting housing 74B, the assembly may include four spacers, one for each fastener inserted through the mounting bracket 74A, to offset the mounting bracket from the object.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

The programs and other executable program components, such as the operating system, may be considered as discrete blocks. It is recognized, however, that such programs and components reside at various times in different storage components of a computing device, and are executed by a data processor(s) of the device.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure.

Moreover, the computing system environment should not be interpreted as having any dependency or requirement relating to any one or combination of components illustrated in the exemplary operating environment. Examples of receiver-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

Other Statements of the Disclosure

The following are statements of example embodiments described in the present disclosure. Although some of the following statements are not currently presented as claims, the statements are believed to be patentable and may subsequently be presented as claims. Associated methods corresponding to the statements or apparatus or systems below, are also believed to be patentable and may subsequently be presented as claims. It is understood that the following statements may refer to and be supported by one, more than one or all of the embodiments described above.

A1. A container comprising:
a base having an interior with an opening sized and shaped to permit access to the interior;
a lid supported by the base and pivotable relative to the base between a closed position where the lid is arranged to close the opening of the interior and an open position where the lid is arranged to permit access to the interior via the opening; and
a latch assembly configured to secure the lid in the closed position, the latch assembly including a first latch, a second latch, and a handle, the first and second latches configured to secure the lid in the closed position, the handle being operatively connected to the first and second latches for releasing the first and second latches to permit the lid to move from the closed position toward the open position.

A2. The container of statement A1, wherein the handle is the one and only handle of the latch assembly required to be actuated for releasing the first and second latches.

A3. The container of statement A1, wherein the handle is movable from a first position towards a second position to release the first and second latches.

A4. The container of statement A3, wherein the first and second latches are moveable between a securing configuration where the first and second latches are arranged to secure the lid in the closed position and a release configuration where the first and second latches are arranged to permit the lid to move from the closed position toward the open position, and wherein the handle is operatively connected to the first and second latches such that movement of the handle from the first position toward the second position results in the first and second latches moving from the securing configuration toward the release configuration.

A5. The container of statement A1, wherein the first and second latches each comprise a cam latch having a cam.

A6. The container of statement A5, wherein the handle is operatively connected to the cams of the first and second latches such that movement of the handle relative to the lid results in the cams of the first and second latches moving relative to the lid.

A7. The container of statement A6, wherein the handle is operatively connected to the cams of the first and second latches such that movement of the handle relative to the lid results in the cams of the first and second latches moving relative to the lid.

A8. The container of statement A7, wherein the latch assembly includes a connecting link interconnecting the cams of the first and second latches, the handle mounted to the connecting link.

B1. A container assembly comprising:
a container having opposite first and second sidewalls, the first sidewall including a first connection recess and the second sidewall including a second connection recess; and
a container mount including:
a base configured to be attached to a mounting surface;
a first retainer supported by the base, the first retainer arranged to be received by the first connection recess;
a second retainer supported by the base, the second retainer arranged to be received by the second connection recess, wherein the first and second retainers are configured to couple the container to the container mount when the first and second retainers are received by the respective first and second connection recesses; and
a foot pedal operatively connected to the first retainer such that actuation of the food pedal moves the first retainer relative to the base.

C1. An aeration assembly for a container, the aeration assembly comprising:
a pump unit mount including an air outlet port and a first air connection fitting fluidly coupled to the air outlet port;
a pump unit removably connectable to the pump unit mount, the pump unit including an air pump configured to supply air, a power source configured to power the air pump, and a second air connection fitting fluidly coupled to the air pump, the second air connection fitting configured to couple to the first air connection fitting when the pump unit is connected to the pump unit mount to fluidly couple the air pump to the air outlet to supply air for the air outlet.

C2. The aeration assembly of statement C1, further comprising an air diffuser and a conduit fluidly coupling the air diffuser to the air outlet port.

C3. The aeration assembly of statement C1, wherein the pump unit mount includes a container connector configured to attach the pump unit mount to the container.

C4. The aeration assembly of statement C3, wherein the container connector includes an adhesive arranged to adhere the pump unit mount to the container, one or more fastener openings configured to receive fasteners for fastening the pump unit mount to the container, and/or a hook configured to connect the pump unit mount to the container.

C5. The aeration assembly of statement C1, in combination with the container, the pump unit mount integrally formed with the container.

C6. The aeration assembly of statement C1, in combination with the container, the container comprising a bucket.

C7. The aeration assembly of statement C1, wherein the pump unit mount includes a one-way valve disposed fluidly between the air outlet port and the first air connection fitting.

C8. The aeration assembly of statement C1, wherein the pump unit is readily connectable and disconnectable from the pump unit mount by hand without the use of tools.

C9. The aeration assembly of statement C1, wherein the pump unit mount includes a resiliently deformable retainer configured to secure the pump unit to the pump unit mount, the resiliently deformable retainer being configured to be deformed by the pump unit from an at rest position to a deformed position and configured to then move back toward the at rest position to secure the pump unit to the pump unit mount when the pump unit is being connected to the pump unit mount.

C10. The aeration assembly of statement C1, wherein one of the first air connection fitting or the second air connection fitting comprises a sealing surface and the other of the first air connection fitting or the second air connection fitting comprises a resiliently deformable sealer arranged to engage and form an air tight seal with the sealing surface when the pump unit is connected to the pump unit mount.

What is claimed is:
1. A container for aquatic live bait, the container comprising:
a base having an interior sized and shaped to hold water with aquatic live bait, the interior having an opening sized and shaped to permit aquatic live bait to be inserted into and removed from the interior, the base including an air diffuser arranged to deliver air to the interior to aerate water in the interior and a first air connection fitting fluidly coupled to the air diffuser; and
a pump unit removably connectable to the base, the pump unit including a housing, an air pump configured to supply air, a power source configured to power the air pump, and a second air connection fitting fluidly coupled to the air pump, the housing supporting the air pump, the power source, and the second air connection fitting, the second air connection fitting configured to couple to the first air connection fitting to form a pneumatic connection fluidly coupling the air pump to the air diffuser to supply air for the air diffuser;

wherein the second air connection fitting is secured with respect to the housing to be moveable conjointly with the housing to permit a user to move the housing toward the first air connection fitting to cause the second air connection fitting to engage the first air connection fitting to form the pneumatic connection.

2. The container of claim 1, wherein one of the first air connection fitting or the second air connection fitting comprises a male connection fitting and the other of the first air connection fitting or the second air connection fitting comprises a female connection fitting configured to receive the male connection fitting.

3. The container of claim 1, wherein one of the first air connection fitting or the second air connection fitting comprises a sealing surface and the other of the first air connection fitting or the second air connection fitting comprises a resiliently deformable sealer arranged to engage and form an air tight seal with the sealing surface when the pump unit is connected to the base.

4. The container of claim 3, wherein the first air connection fitting comprises the sealing surface and the second air connection fitting comprises the resiliently deformable sealer.

5. The container of claim 4, wherein the resiliently deformable sealer comprises a rubber nipple.

6. The container of claim 1, wherein the base includes a mount configured releaseably engage the pump unit to removably connect the pump unit to the base.

7. The container of claim 6, wherein the pump unit is configured to form a mounting connection with the mount generally simultaneously with the formation of a pneumatic connection between the first and second air connection fittings when the pump unit is removably connected to the mount.

8. The container of claim 6, wherein the pump unit is readily connectable and disconnectable from the mount by hand without the use of tools.

9. The container of claim 8, wherein the mount includes a clip arranged to engage the pump unit to secure the pump unit to the base.

10. The container of claim 6, wherein the mount includes a resiliently deformable retainer configured to secure the pump unit to the base, the resiliently deformable retainer being configured to be deformed by the pump unit from an at rest position to a deformed position and then move back toward the at rest position to secure the pump unit to the base when the pump unit is being connected to the mount.

11. The container of claim 6, wherein the first air connection fitting is part of the mount.

12. The container of claim 6, wherein the mount includes a lower wall and opposite sidewalls, the lower wall arranged to engage and support the pump unit when the pump unit is removably connected to the base, the sidewalls arranged to engage the pump unit to inhibit the pump unit from moving relative to the mount when the pump unit is removably connected to the base.

13. The container of claim 1, wherein the pump unit includes an air inlet fluidly connected to the air pump and arranged to permit air from the ambient environment to be drawn through the air inlet by the air pump, the air inlet being arranged to face the base when the pump unit is removably connected to the base.

14. The container of claim 13, wherein the base includes a sidewall bounding the interior, the sidewall having an exteriorly facing sidewall recess, the air inlet being arranged such that the air inlet is disposed in the sidewall recess when the pump unit is removably connected to the base.

15. The container of claim 1, wherein the housing is waterproof and contains the air pump and the battery.

16. The container of claim 1, wherein base includes a bottom wall and a sidewall, the base and the sidewall bounding the interior, the pump unit being removably connectable to the sidewall of the base.

17. The container of claim 1, further comprising a conduit extending from the first air connection fitting to the air diffuser to fluidly couple the air diffuser to the first air connection fitting.

18. The container of claim 17, further comprising a one-way valve disposed along the conduit and configured to inhibit water from the interior from flowing into the pump unit when the pump unit is removably connected to the base.

19. The container of claim 17, wherein the conduit is entirely outside of the interior of the base.

20. The container of claim 6, further comprising a lid configured to close the opening of the interior and a hinge pivotably connecting the lid to the base.

21. The container of claim 1, wherein the base defines an air path extending from the first connection fitting to the air diffuser along which air supplied by the pump unit flows toward the air diffuser when the pump unit is removably connected to the base, wherein the entirety of the air path is spaced apart from the interior of the base.

22. The container of claim 1, wherein the base includes a sidewall bounding the interior, the sidewall including a sidewall recess having a top, a bottom, and an open side facing exteriorly, the first air connection fitting being disposed in the sidewall recess.

23. The container of claim 22, wherein the second air connection fitting of the pump unit is arranged such that the second air connection fitting is disposed in the sidewall recess when the pump unit is removably connected to the base.

24. The container of claim 22, wherein the pump unit extends out of the open side of the sidewall recess when the pump unit is removably connected to the base.

25. The container of claim 1, wherein the base includes a bottom surface bounding a bottom of the interior, wherein the air diffuser is recessed into the bottom surface of the base.

26. The container of claim 1, wherein the pump unit is disposed at an elevation below the opening of the interior when the pump unit is removably connected to the base.

27. The container of claim 1, wherein the second air connection fitting is fixed with respect to the housing.

28. The container of claim 1, wherein the second air connection fitting has a surface configured to engage the first air connection fitting to form the pneumatic connection, the surface being secured in a fixed position with respect to the housing.

29. The container of claim 1, wherein the first air connection fitting is secured in a fixed position with respect to the interior of the base.

30. The container of claim 1, wherein an interface between the first and second air connection fittings is in a fixed position with respect to the interior of the base when the first and second air connection fittings are coupled together to form the pneumatic connection.

31. A container for aquatic live bait, the container comprising:

a base having an interior sized and shaped to hold water with aquatic live bait, the interior having an opening sized and shaped to permit aquatic live bait to be inserted into and removed from the interior, the base including an air diffuser arranged to deliver air to the interior to aerate water in the interior and a first air connection fitting fluidly coupled to the air diffuser; and a pump unit removably connectable to the base, the pump unit including an air pump configured to supply air, a power source configured to power the air pump, and a second air connection fitting fluidly coupled to the air pump, the second air connection fitting configured to couple to the first air connection fitting to fluidly couple the air pump to the air diffuser to supply air for the air diffuser;

wherein one of the first air connection fitting or the second air connection fitting comprises a sealing surface and the other of the first air connection fitting or the second air connection fitting comprises a resiliently deformable nipple arranged to engage and form an air tight seal with the sealing surface when the pump unit is connected to the base.

32. The container of claim 27, wherein the first air connection fitting comprises the sealing surface and the second air connection fitting comprises the resiliently deformable sealer.

33. The container of claim 27, wherein the resiliently deformable nipple comprises rubber.

34. The container of claim 27, wherein the first air connection fitting defines a space configured to receive the resiliently deformable nipple, the sealing surface bounding the space.

35. The container of claim 30, wherein the first air connection fitting comprises a guide configured to guide the resiliently deformable nipple into the space when the first and second air connection fittings are coupled together.

36. The container of claim 31, wherein the guide comprises an annular ramp.

37. The container of claim 27, wherein the sealing surface bounds a base of the space.

38. The container of claim 27, wherein the sealing surface is cylindrical.

39. The container of claim 34, wherein a diameter of the sealing surface is less than a diameter of the resiliently deformable nipple.

40. A container for aquatic live bait, the container comprising:

a base having an interior sized and shaped to hold water with aquatic live bait, the interior having an opening sized and shaped to permit aquatic live bait to be inserted into and removed from the interior, the base including an air diffuser arranged to deliver air to the interior to aerate water in the interior and a first air connection fitting fluidly coupled to the air diffuser; and a pump unit removably connectable to the base, the pump unit including an air pump configured to supply air, a power source configured to power the air pump, and a second air connection fitting fluidly coupled to the air pump, the second air connection fitting configured to couple to the first air connection fitting to fluidly couple the air pump to the air diffuser to supply air for the air diffuser;

wherein the base includes a mount configured releaseably engage the pump unit to removably connect the pump unit to the base; and wherein the pump unit is configured to form a mounting connection with the mount generally simultaneously with the formation of a pneumatic connection between the first and second air connection fittings when the pump unit is removably connected to the mount.

41. The container of claim 39, wherein the pump unit is readily connectable and disconnectable from the mount by hand without the use of tools.

42. The container of claim 40, wherein the mount includes a clip arranged to engage the pump unit to secure the pump unit to the base.

43. The container of claim 40, wherein the mount includes a resiliently deformable retainer configured to secure the pump unit to the base, the resiliently deformable retainer being configured to be deformed by the pump unit from an at rest position to a deformed position and then move back toward the at rest position to secure the pump unit to the base when the pump unit is being connected to the mount.

44. The container of claim 40, wherein the first air connection fitting is part of the mount.

45. The container of claim 40, wherein the mount includes a lower wall and opposite sidewalls, the lower wall arranged to engage and support the pump unit when the pump unit is removably connected to the base, the sidewalls arranged to engage the pump unit to inhibit the pump unit from moving relative to the mount when the pump unit is removably connected to the base.

46. A container for aquatic live bait, the container comprising:

a base having an interior sized and shaped to hold water with aquatic live bait, the interior having an opening sized and shaped to permit aquatic live bait to be inserted into and removed from the interior, the base including an air diffuser arranged to deliver air to the interior to aerate water in the interior and a first air connection fitting fluidly coupled to the air diffuser; and a pump unit removably connectable to the base, the pump unit including an air pump configured to supply air, a power source configured to power the air pump, and a second air connection fitting fluidly coupled to the air pump, the second air connection fitting configured to couple to the first air connection fitting to fluidly couple the air pump to the air diffuser to supply air for the air diffuser;

wherein the base includes a mount configured releaseably engage the pump unit to removably connect the pump unit to the base, the first air connection fitting being part of the mount.

47. The container of claim 45, wherein one of the first air connection fitting or the second air connection fitting comprises a male connection fitting and the other of the first air connection fitting or the second air connection fitting comprises a female connection fitting configured to receive the male connection fitting.

48. The container of claim 45, wherein one of the first air connection fitting or the second air connection fitting comprises a sealing surface and the other of the first air connection fitting or the second air connection fitting comprises a resiliently deformable sealer arranged to engage and form an air tight seal with the sealing surface when the pump unit is connected to the base.

49. The container of claim 47, wherein the first air connection fitting comprises the sealing surface and the second air connection fitting comprises the resiliently deformable sealer.

50. The container of claim 45, wherein the pump unit is readily connectable and disconnectable from the mount by hand without the use of tools.

51. The container of claim 49, wherein the mount includes a clip arranged to engage the pump unit to secure the pump unit to the base.

52. The container of claim 45, wherein the mount includes a resiliently deformable retainer configured to secure the pump unit to the base, the resiliently deformable retainer being configured to be deformed by the pump unit from an at rest position to a deformed position and then move back toward the at rest position to secure the pump unit to the base when the pump unit is being connected to the mount.

53. The container of claim 45, wherein the mount includes a lower wall and opposite sidewalls, the lower wall arranged to engage and support the pump unit when the pump unit is removably connected to the base, the sidewalls arranged to engage the pump unit to inhibit the pump unit from moving relative to the mount when the pump unit is removably connected to the base.

\* \* \* \* \*